United States Patent
Shemesh et al.

(10) Patent No.: US 12,212,586 B2
(45) Date of Patent: Jan. 28, 2025

(54) TECHNIQUES FOR CYBERSECURITY INSPECTION BASED ON RUNTIME DATA AND STATIC ANALYSIS FROM CLONED RESOURCES

(71) Applicant: Wiz, Inc., New York, NY (US)

(72) Inventors: Daniel Hershko Shemesh, Givat-Shmuel (IL); Yarin Miran, Rishon Lezion (IL); Roy Reznik, Tel Aviv (IL); Ami Luttwak, Binyamina (IL); Yinon Costica, Tel Aviv (IL); Aviel Fogel, Tel Aviv (IL); Udi Reitblat, Tel Aviv (IL); Alon Schindel, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/428,814

(22) Filed: Jan. 31, 2024

(65) Prior Publication Data

US 2024/0244065 A1    Jul. 18, 2024

Related U.S. Application Data

(63) Continuation-in-part of application No. 18/457,017, filed on Aug. 28, 2023, which is a continuation of
(Continued)

(51) Int. Cl.
*H04L 9/40* (2022.01)
*G06F 21/53* (2013.01)
*G06F 21/55* (2013.01)

(52) U.S. Cl.
CPC .......... *H04L 63/1416* (2013.01); *G06F 21/53* (2013.01); *G06F 21/554* (2013.01); *H04L 63/1425* (2013.01); *G06F 2221/032* (2013.01)

(58) Field of Classification Search
CPC . H04L 63/1416; H04L 63/1425; G06F 21/53; G06F 21/554; G06F 2221/032
See application file for complete search history.

(56) References Cited

U.S. PATENT DOCUMENTS 6,910,132 B1   6/2005   Bhattacharya
7,627,652 B1   12/2009  Commons et al.
(Continued)

FOREIGN PATENT DOCUMENTS

EP   4160983 A1   4/2023
EP   4254869 A2   10/2023
RU   2421792 C2   6/2011

OTHER PUBLICATIONS

Ali Gholami; Security and Privacy of Sensitive Data in Cloud Computing: a Survey of Recent Developments; ARIX:2016; pp. 131-150.
(Continued)

*Primary Examiner* — Christopher A Revak
(74) *Attorney, Agent, or Firm* — M&B IP Analysts, LLC

(57) ABSTRACT

A system and method for detecting cybersecurity risk on a resource in a computing environment utilizes static analysis of a cloned resource and runtime data from the live resource. The method includes: configuring a resource deployed in a computing environment to deploy thereon a sensor, the sensor configured to detect runtime data; detecting runtime data from the sensor of the resource; generating an inspectable disk based on an original disk of the resource; initiating inspection based on the detected runtime data for a cybersecurity object on the inspectable disk; detecting the cybersecurity object on an inspectable disk; and initiating a mitigation action on the resource.

19 Claims, 10 Drawing Sheets

Related U.S. Application Data application No. 18/045,046, filed on Oct. 7, 2022, now Pat. No. 11,841,945, application No. 18/428,814 is a continuation-in-part of application No. 17/664,508, filed on May 23, 2022.

(56) References Cited

U.S. PATENT DOCUMENTS

| | | | |
|---|---|---|---|
| 7,784,101 | B2 | 8/2010 | Verbowski et al. |
| 8,200,965 | B2 | 6/2012 | Fujibayashi et al. |
| 8,352,431 | B1 | 1/2013 | Protopopov et al. |
| 8,412,688 | B1 | 4/2013 | Armangau et al. |
| 8,413,239 | B2 | 4/2013 | Sutton |
| 8,417,967 | B2 | 4/2013 | Foster et al. |
| 8,499,354 | B1 | 7/2013 | Satish et al. |
| 8,595,822 | B2 | 11/2013 | Schrecker et al. |
| 8,701,200 | B2 | 4/2014 | Naldurg et al. |
| 8,789,049 | B2 | 7/2014 | Hutchins et al. |
| 8,898,481 | B1 | 11/2014 | Osburn, III et al. |
| 8,904,525 | B1* | 12/2014 | Hodgman ............. G06F 21/566 726/22 |
| 8,914,406 | B1 | 12/2014 | Haugsnes |
| 9,009,836 | B1* | 4/2015 | Yarykin ............. G06F 9/45558 726/25 |
| 9,094,379 | B1 | 7/2015 | Miller |
| 9,119,017 | B2 | 8/2015 | Sinha |
| 9,165,142 | B1 | 10/2015 | Sanders et al. |
| 9,172,621 | B1 | 10/2015 | Dippenaar |
| 9,330,273 | B2 | 5/2016 | Khetawat et al. |
| 9,369,433 | B1 | 6/2016 | Paul |
| 9,419,996 | B2 | 8/2016 | Porat |
| 9,438,634 | B1 | 9/2016 | Ross et al. |
| 9,467,473 | B2 | 10/2016 | Jayaraman |
| 9,544,327 | B1 | 1/2017 | Sharma et al. |
| 9,563,385 | B1 | 2/2017 | Kowalski et al. |
| 9,569,328 | B2 | 2/2017 | Pavlov et al. |
| 9,582,662 | B1 | 2/2017 | Messick et al. |
| 9,596,235 | B2 | 3/2017 | Badam et al. |
| 9,607,104 | B1 | 3/2017 | Turner et al. |
| 9,646,172 | B1 | 5/2017 | Hahn |
| 9,661,009 | B1 | 5/2017 | Karandikar et al. |
| 9,672,355 | B2 | 6/2017 | Titonis et al. |
| 9,712,503 | B1 | 7/2017 | Ahmed |
| 9,892,261 | B2* | 2/2018 | Joram ................... G06F 21/577 |
| 10,002,247 | B2 | 6/2018 | Suarez et al. |
| 10,032,032 | B2 | 7/2018 | Suarez et al. |
| 10,063,445 | B1 | 8/2018 | Preece |
| 10,135,826 | B2 | 11/2018 | Reddy |
| 10,229,125 | B2 | 3/2019 | Goodman et al. |
| 10,255,370 | B2 | 4/2019 | Carpenter et al. |
| 10,360,025 | B2 | 7/2019 | Foskett et al. |
| 10,412,103 | B2 | 9/2019 | Haugsnes |
| 10,412,109 | B2* | 9/2019 | Loureiro ............... G06F 21/577 |
| 10,459,664 | B1 | 10/2019 | Dreier et al. |
| 10,503,904 | B1 | 12/2019 | Singh et al. |
| 10,536,471 | B1* | 1/2020 | Derbeko ................. G06F 21/53 |
| 10,540,499 | B2 | 1/2020 | Wailly et al. |
| 10,552,610 | B1 | 2/2020 | Vashisht et al. |
| 10,554,507 | B1 | 2/2020 | Siddiqui et al. |
| 10,567,468 | B2 | 2/2020 | Perlmutter |
| 10,572,226 | B2 | 2/2020 | Biskup et al. |
| 10,574,675 | B2 | 2/2020 | Peppe et al. |
| 10,623,386 | B1 | 4/2020 | Bernat et al. |
| 10,630,642 | B2 | 4/2020 | Clark et al. |
| 10,664,619 | B1 | 5/2020 | Marelas |
| 10,691,636 | B2 | 6/2020 | Tabaaloute et al. |
| 10,721,260 | B1 | 7/2020 | Schlarp et al. |
| 10,725,775 | B2 | 7/2020 | Suarez et al. |
| 10,735,430 | B1 | 8/2020 | Stoler |
| 10,735,442 | B1 | 8/2020 | Swackhamer |
| 10,791,138 | B1* | 9/2020 | Siddiqui ............... G06F 21/105 |
| 10,803,188 | B1 | 10/2020 | Rajput et al. |
| 10,831,898 | B1 | 11/2020 | Wagner |
| 10,915,626 | B2 | 2/2021 | Tang |
| 10,924,503 | B1 | 2/2021 | Pereira et al. |
| 10,972,484 | B1 | 4/2021 | Swackhamer |
| 10,997,293 | B2 | 5/2021 | Wiest et al. |
| 11,005,860 | B1 | 5/2021 | Glyer et al. |
| 11,016,954 | B1 | 5/2021 | Babocichin et al. |
| 11,044,118 | B1 | 6/2021 | Reed et al. |
| 11,055,414 | B2 | 7/2021 | Claes |
| 11,064,032 | B1 | 7/2021 | Yang et al. |
| 11,099,976 | B2 | 8/2021 | Khakare et al. |
| 11,102,231 | B2 | 8/2021 | Kraning et al. |
| 11,165,652 | B1 | 11/2021 | Byrne |
| 11,216,563 | B1 | 1/2022 | Veselov et al. |
| 11,245,730 | B2 | 2/2022 | Bailey |
| 11,271,961 | B1 | 3/2022 | Berger |
| 11,334,670 | B2* | 5/2022 | Franco .................. G06F 21/645 |
| 11,366,897 | B1 | 6/2022 | Ramanathan et al. |
| 11,388,183 | B2 | 7/2022 | Hoopes et al. |
| 11,405,426 | B2 | 8/2022 | Nguyen |
| 11,444,974 | B1 | 9/2022 | Shakhzadyan |
| 11,483,317 | B1 | 10/2022 | Bolignano et al. |
| 11,496,498 | B2 | 11/2022 | Wright et al. |
| 11,496,519 | B1 | 11/2022 | Gupta et al. |
| 11,503,063 | B2 | 11/2022 | Rao |
| 11,507,672 | B1 | 11/2022 | Pagnozzi et al. |
| 11,516,222 | B1 | 11/2022 | Srinivasan et al. |
| 11,520,907 | B1 | 12/2022 | Borowiec et al. |
| 11,546,360 | B2 | 1/2023 | Woodford et al. |
| 11,556,659 | B1 | 1/2023 | Kumar et al. |
| 11,558,401 | B1 | 1/2023 | Vashisht et al. |
| 11,558,423 | B2 | 1/2023 | Gordon et al. |
| 11,567,751 | B2* | 1/2023 | Cosentino ................. G06F 8/71 |
| 11,570,090 | B2 | 1/2023 | Shen et al. |
| 11,575,696 | B1 | 2/2023 | Ithal et al. |
| 11,614,956 | B2 | 3/2023 | Tsirkin et al. |
| 11,645,390 | B2 | 5/2023 | Vijayvargiya et al. |
| 11,662,928 | B1 | 5/2023 | Kumar et al. |
| 11,663,340 | B2 | 5/2023 | Wu et al. |
| 11,669,386 | B1 | 6/2023 | Abrol |
| 11,700,233 | B2 | 7/2023 | St. Pierre |
| 11,750,566 | B1 | 9/2023 | Montilla Lugo |
| 11,757,844 | B2 | 9/2023 | Xiao |
| 11,770,398 | B1 | 9/2023 | Erlingsson |
| 11,792,284 | B1 | 10/2023 | Nanduri |
| 11,799,874 | B1 | 10/2023 | Lichtenstein et al. |
| 11,803,766 | B1 | 10/2023 | Srinivasan |
| 11,841,945 | B1* | 12/2023 | Fogel ...................... G06F 21/53 |
| 11,914,707 | B1 | 2/2024 | Ramanathan et al. |
| 11,922,220 | B2 | 3/2024 | Haghighat et al. |
| 11,936,785 | B1 | 3/2024 | Shemesh et al. |
| 12,019,770 | B2 | 6/2024 | Nilsson et al. |
| 12,050,696 | B2 | 7/2024 | Pieno et al. |
| 12,058,177 | B2 | 8/2024 | Crabtree et al. |
| 2003/0188194 | A1 | 10/2003 | Currie et al. |
| 2003/0217039 | A1 | 11/2003 | Kurtz et al. |
| 2005/0050365 | A1 | 3/2005 | Seki et al. |
| 2005/0251863 | A1 | 11/2005 | Sima |
| 2005/0283645 | A1 | 12/2005 | Turner et al. |
| 2007/0174915 | A1 | 7/2007 | Gribble et al. |
| 2007/0271360 | A1 | 11/2007 | Sahita et al. |
| 2008/0075283 | A1 | 3/2008 | Takahashi |
| 2008/0221833 | A1 | 9/2008 | Brown et al. |
| 2008/0307020 | A1 | 12/2008 | Ko et al. |
| 2008/0320594 | A1 | 12/2008 | Jiang |
| 2009/0106256 | A1 | 4/2009 | Safari et al. |
| 2009/0271863 | A1 | 10/2009 | Govindavajhala et al. |
| 2010/0242082 | A1 | 9/2010 | Keene et al. |
| 2010/0281275 | A1 | 11/2010 | Lee et al. |
| 2011/0055361 | A1 | 3/2011 | Dehaan |
| 2011/0276806 | A1 | 11/2011 | Casper et al. |
| 2012/0110651 | A1 | 5/2012 | Van Biljon et al. |
| 2012/0297206 | A1 | 11/2012 | Nord et al. |
| 2013/0024940 | A1 | 1/2013 | Hutchins et al. |
| 2013/0054890 | A1 | 2/2013 | Desai et al. |
| 2013/0124669 | A1 | 5/2013 | Anderson et al. |
| 2013/0160119 | A1 | 6/2013 | Sartin |
| 2013/0160129 | A1 | 6/2013 | Sartin |
| 2013/0290708 | A1 | 10/2013 | Diaz et al. |
| 2014/0096134 | A1 | 4/2014 | Barak |
| 2014/0115578 | A1 | 4/2014 | Cooper et al. |
| 2014/0237537 | A1 | 8/2014 | Manmohan |

(56) References Cited

U.S. PATENT DOCUMENTS

| | | |
|---|---|---|
| 2014/0317677 A1 | 10/2014 | Vaidya |
| 2014/0337613 A1 | 11/2014 | Martini |
| 2015/0033305 A1 | 1/2015 | Shear |
| 2015/0055647 A1 | 2/2015 | Roberts |
| 2015/0163192 A1 | 6/2015 | Jain |
| 2015/0172321 A1 | 6/2015 | Kirti et al. |
| 2015/0254364 A1 | 9/2015 | Piduri et al. |
| 2015/0304302 A1 | 10/2015 | Zhang et al. |
| 2015/0310215 A1 | 10/2015 | McBride et al. |
| 2015/0319160 A1 | 11/2015 | Ferguson et al. |
| 2016/0063466 A1 | 3/2016 | Sheridan et al. |
| 2016/0078231 A1 | 3/2016 | Bach et al. |
| 2016/0103669 A1 | 4/2016 | Gamage et al. |
| 2016/0105454 A1 | 4/2016 | Li |
| 2016/0140352 A1 | 5/2016 | Nickolov |
| 2016/0156664 A1 | 6/2016 | Nagaratnam |
| 2016/0224600 A1 | 8/2016 | Munk |
| 2016/0299708 A1 | 10/2016 | Yang et al. |
| 2016/0366185 A1 | 12/2016 | Lee et al. |
| 2017/0026416 A1 | 1/2017 | Carpenter et al. |
| 2017/0070506 A1 | 3/2017 | Reddy |
| 2017/0104755 A1 | 4/2017 | Arregoces |
| 2017/0111384 A1 | 4/2017 | Loureiro et al. |
| 2017/0180421 A1* | 6/2017 | Shieh ............... H04L 63/10 |
| 2017/0185784 A1 | 6/2017 | Madou |
| 2017/0187743 A1 | 6/2017 | Madou |
| 2017/0223024 A1 | 8/2017 | Desai |
| 2017/0230179 A1 | 8/2017 | Mannan et al. |
| 2017/0237560 A1 | 8/2017 | Mueller et al. |
| 2017/0257347 A1 | 9/2017 | Yan |
| 2017/0285978 A1 | 10/2017 | Manasse |
| 2017/0034198 A1 | 12/2017 | Powers et al. |
| 2017/0374136 A1 | 12/2017 | Ringdahl |
| 2018/0004950 A1 | 1/2018 | Gupta et al. |
| 2018/0007087 A1 | 1/2018 | Grady et al. |
| 2018/0026995 A1* | 1/2018 | Dufour ............... H04W 12/128 726/23 |
| 2018/0027009 A1 | 1/2018 | Santos |
| 2018/0063290 A1 | 3/2018 | Yang et al. |
| 2018/0081640 A1* | 3/2018 | Collins ............... G06F 8/34 |
| 2018/0150412 A1 | 5/2018 | Manasse |
| 2018/0159882 A1 | 6/2018 | Brill |
| 2018/0181310 A1 | 6/2018 | Feinberg et al. |
| 2018/0191726 A1 | 7/2018 | Luukkala |
| 2018/0219888 A1 | 8/2018 | Apostolopoulos |
| 2018/0234459 A1 | 8/2018 | Kung |
| 2018/0239902 A1 | 8/2018 | Godard |
| 2018/0260566 A1 | 9/2018 | Chaganti et al. |
| 2018/0270268 A1 | 9/2018 | Gorodissky et al. |
| 2018/0276084 A1 | 9/2018 | Mitkar et al. |
| 2018/0278639 A1 | 9/2018 | Bernstein et al. |
| 2018/0288129 A1 | 10/2018 | Joshi et al. |
| 2018/0309747 A1 | 10/2018 | Sweet et al. |
| 2018/0321993 A1 | 11/2018 | McClory |
| 2018/0341768 A1 | 11/2018 | Marshall et al. |
| 2018/0359058 A1 | 12/2018 | Kurian |
| 2018/0359059 A1 | 12/2018 | Kurian |
| 2019/0007271 A1 | 1/2019 | Rickards et al. |
| 2019/0018961 A1* | 1/2019 | Kostyushko ............ H04L 9/002 |
| 2019/0058722 A1 | 2/2019 | Levin et al. |
| 2019/0068617 A1 | 2/2019 | Coleman |
| 2019/0068627 A1 | 2/2019 | Thampy |
| 2019/0104140 A1 | 4/2019 | Gordeychik et al. |
| 2019/0116111 A1 | 4/2019 | Izard et al. |
| 2019/0121986 A1 | 4/2019 | Stopel et al. |
| 2019/0132350 A1 | 5/2019 | Smith et al. |
| 2019/0149604 A1 | 5/2019 | Jahr |
| 2019/0166129 A1 | 5/2019 | Gaetjen et al. |
| 2019/0171811 A1* | 6/2019 | Daniel ............... G06F 21/53 |
| 2019/0191417 A1 | 6/2019 | Baldemair et al. |
| 2019/0205267 A1 | 7/2019 | Richey et al. |
| 2019/0207966 A1 | 7/2019 | Vashisht et al. |
| 2019/0220575 A1 | 7/2019 | Boudreau et al. |
| 2019/0245883 A1 | 8/2019 | Gorodissky et al. |
| 2019/0260764 A1 | 8/2019 | Humphrey et al. |
| 2019/0278928 A1 | 9/2019 | Rungta et al. |
| 2019/0354675 A1 | 11/2019 | Gan et al. |
| 2019/0377988 A1 | 12/2019 | Qi et al. |
| 2020/0007314 A1 | 1/2020 | Vouk et al. |
| 2020/0007569 A1 | 1/2020 | Dodge et al. |
| 2020/0012659 A1 | 1/2020 | Dageville et al. |
| 2020/0012818 A1 | 1/2020 | Levin et al. |
| 2020/0028862 A1 | 1/2020 | Lin |
| 2020/0044916 A1 | 2/2020 | Kaufman et al. |
| 2020/0050440 A1 | 2/2020 | Chuppala et al. |
| 2020/0082094 A1 | 3/2020 | McAllister et al. |
| 2020/0106782 A1 | 4/2020 | Sion |
| 2020/0125352 A1 | 4/2020 | Kannan |
| 2020/0145405 A1 | 5/2020 | Bosch et al. |
| 2020/0244678 A1 | 7/2020 | Shua |
| 2020/0244692 A1 | 7/2020 | Shua |
| 2020/0259852 A1 | 8/2020 | Wolff et al. |
| 2020/0287927 A1 | 9/2020 | Zadeh et al. |
| 2020/0320845 A1 | 10/2020 | Livny et al. |
| 2020/0336489 A1 | 10/2020 | Wuest et al. |
| 2020/0382556 A1 | 12/2020 | Woolward et al. |
| 2020/0387357 A1 | 12/2020 | Mathon et al. |
| 2020/0389431 A1 | 12/2020 | St. Pierre |
| 2020/0389469 A1 | 12/2020 | Litichever et al. |
| 2020/0409741 A1 | 12/2020 | Dornemann et al. |
| 2021/0026932 A1 | 1/2021 | Boudreau et al. |
| 2021/0042263 A1 | 2/2021 | Zdornov et al. |
| 2021/0089662 A1 | 3/2021 | Muniswamy-Reddy et al. |
| 2021/0105304 A1 | 4/2021 | Kraning et al. |
| 2021/0144517 A1 | 5/2021 | Guim Bernat et al. |
| 2021/0149788 A1 | 5/2021 | Downie |
| 2021/0158835 A1 | 5/2021 | Hill et al. |
| 2021/0168150 A1 | 6/2021 | Ross et al. |
| 2021/0176123 A1 | 6/2021 | Plamondon |
| 2021/0176164 A1 | 6/2021 | Kung et al. |
| 2021/0185073 A1 | 6/2021 | Ewaida et al. |
| 2021/0200881 A1 | 7/2021 | Joshi et al. |
| 2021/0203684 A1 | 7/2021 | Maor et al. |
| 2021/0211453 A1 | 7/2021 | Cooney |
| 2021/0216630 A1 | 7/2021 | Karr |
| 2021/0218567 A1 | 7/2021 | Richards et al. |
| 2021/0226812 A1 | 7/2021 | Park |
| 2021/0226928 A1 | 7/2021 | Crabtree et al. |
| 2021/0234889 A1 | 7/2021 | Burle et al. |
| 2021/0263802 A1 | 8/2021 | Gottemukkula et al. |
| 2021/0306416 A1 | 9/2021 | Mukhopadhyay et al. |
| 2021/0314342 A1 | 10/2021 | Oberg |
| 2021/0320794 A1 | 10/2021 | Auh et al. |
| 2021/0329019 A1 | 10/2021 | Shua |
| 2021/0334386 A1 | 10/2021 | AlGhamdi et al. |
| 2021/0357246 A1 | 11/2021 | Kumar |
| 2021/0360032 A1 | 11/2021 | Crabtree et al. |
| 2021/0368045 A1 | 11/2021 | Verma et al. |
| 2021/0382995 A1 | 12/2021 | Massiglia et al. |
| 2021/0382997 A1 | 12/2021 | Yi et al. |
| 2021/0409486 A1 | 12/2021 | Martinez |
| 2022/0012771 A1 | 1/2022 | Gustafson et al. |
| 2022/0030020 A1 | 1/2022 | Huffman |
| 2022/0053011 A1 | 2/2022 | Rao et al. |
| 2022/0086173 A1 | 3/2022 | Yavo et al. |
| 2022/0131888 A1 | 4/2022 | Kanso |
| 2022/0156396 A1 | 5/2022 | Bednash et al. |
| 2022/0179964 A1 | 6/2022 | Qiao et al. |
| 2022/0182403 A1* | 6/2022 | Mistry ............... H04L 63/20 |
| 2022/0188273 A1 | 6/2022 | Koorapati et al. |
| 2022/0197926 A1 | 6/2022 | Passey et al. |
| 2022/0210053 A1 | 6/2022 | Du |
| 2022/0215101 A1 | 7/2022 | Rioux et al. |
| 2022/0232024 A1 | 7/2022 | Kapoor |
| 2022/0232042 A1 | 7/2022 | Crabtree et al. |
| 2022/0247791 A1 | 8/2022 | Duminuco et al. |
| 2022/0263656 A1 | 8/2022 | Moore |
| 2022/0284362 A1 | 9/2022 | Bellinger et al. |
| 2022/0309166 A1 | 9/2022 | Shenoy et al. |
| 2022/0326861 A1 | 10/2022 | Shachar et al. |
| 2022/0327119 A1 | 10/2022 | Gasper et al. |
| 2022/0342690 A1 | 10/2022 | Shua |
| 2022/0342997 A1 | 10/2022 | Watanabe et al. |
| 2022/0345481 A1 | 10/2022 | Shua |

(56) References Cited

U.S. PATENT DOCUMENTS

| | | |
|---|---|---|
| 2022/0350931 A1 | 11/2022 | Shua |
| 2022/0357992 A1 | 11/2022 | Karpovsky |
| 2022/0374519 A1 | 11/2022 | Botelho et al. |
| 2022/0400128 A1 | 12/2022 | Kfir et al. |
| 2022/0407841 A1 | 12/2022 | Karpowicz |
| 2022/0407889 A1 | 12/2022 | Narigapalli et al. |
| 2022/0413879 A1 | 12/2022 | Passey et al. |
| 2022/0414103 A1 | 12/2022 | Upadhyay et al. |
| 2022/0417011 A1 | 12/2022 | Shua |
| 2022/0417219 A1 | 12/2022 | Sheriff |
| 2023/0007014 A1 | 1/2023 | Narayan |
| 2023/0040635 A1 | 2/2023 | Narayan |
| 2023/0075355 A1 | 3/2023 | Twigg |
| 2023/0087093 A1 | 3/2023 | Ithal et al. |
| 2023/0093527 A1 | 3/2023 | Shua |
| 2023/0095756 A1 | 3/2023 | Wilkinson et al. |
| 2023/0110080 A1 | 4/2023 | Hen |
| 2023/0123477 A1 | 4/2023 | Luttwak et al. |
| 2023/0125134 A1 | 4/2023 | Raleigh et al. |
| 2023/0134674 A1 | 5/2023 | Quinn et al. |
| 2023/0135240 A1 | 5/2023 | Cody et al. |
| 2023/0136839 A1 | 5/2023 | Sundararajan et al. |
| 2023/0164148 A1 | 5/2023 | Narayan |
| 2023/0164182 A1 | 5/2023 | Kothari et al. |
| 2023/0169165 A1 | 6/2023 | Williams et al. |
| 2023/0171271 A1 | 6/2023 | Williams et al. |
| 2023/0192418 A1 | 6/2023 | Horowitz et al. |
| 2023/0208870 A1 | 6/2023 | Yellapragada et al. |
| 2023/0224319 A1 | 7/2023 | Isoyama et al. |
| 2023/0231867 A1 | 7/2023 | Rampura Venkatachar |
| 2023/0237068 A1 | 7/2023 | Sillifant et al. |
| 2023/0254330 A1 | 8/2023 | Singh |
| 2023/0297666 A1 | 9/2023 | Atamli et al. |
| 2023/0325814 A1 | 10/2023 | Vijayan et al. |
| 2023/0336550 A1 | 10/2023 | Lidgi et al. |
| 2023/0336578 A1 | 10/2023 | Lidgi et al. |
| 2023/0376586 A1 | 11/2023 | Shemesh et al. |
| 2024/0007492 A1 | 1/2024 | Shen et al. |
| 2024/0037229 A1 | 2/2024 | Pabon et al. |
| 2024/0045838 A1 | 2/2024 | Reiss et al. |
| 2024/0073115 A1 | 2/2024 | Chakraborty et al. |
| 2024/0080329 A1 | 3/2024 | Reed et al. |
| 2024/0080332 A1* | 3/2024 | Ganesh ............... G06F 21/577 |
| 2024/0146818 A1 | 5/2024 | Cody et al. |
| 2024/0241752 A1 | 7/2024 | Crabtree et al. |

OTHER PUBLICATIONS

Christos Kyrkou; Towards artificial-intelligence-based cybersecurity for robustifying automated driving systems against camera sensor attacks; IEEE 2020; pp. 476-481.

Guo, yu et al. Enabling Encrypted Rich Queries in Distributed Key-Value Stores. IEEE Transactions on Parallel and Distributed Systems, vol. 30, Issue: 6. https://ieeexplore.ieee.org/stamp/stamp.jsp?tp=&arnumber=8567979 (Year: 2019).

Henry Hanping Feng; Anomaly Detection Using Call Stack Information; IEEE: Year:2003; pp. 1-14.

International Search Report for PCT Application No. PCT/IB2022/060940 dated Feb. 1, 2023. The International Bureau of WIPO.

International Search Report for PCT/IB2023/050848, dated May 9, 2023. International Bureau of WIPO.

International Search Report of PCT/IB2023/058074, dated Nov. 20, 2023. Searching Authority United States Patent and Trademark Office, Alexandria, Virginia.

International Search Report, PCT/IB23/55312. ISA/US, Commissioner for Patents, Alexandria, Virginia. Dated Aug. 30, 2023.

Kumar, Anuj et al. A New Approach for Security in Cloud Data Storage for IOT Applications Using Hybrid Cryptography Technique. 2020 International Conference on Power Electronics & IoT Applications in Renewable Energy and its Control. https://ieeexplore.ieee.org/stamp/stamp.jsp?tp=&arnumber=9087010 (Year: 2020).

Microsoft Build. "Introduction to Azure managed disks". Aug. 21, 2023, https://docs.microsoft.com/en-us/azure/virtual-machines/managed-disks-overview.

Microsoft Docs. "Create a VM from a managed image". Article. Jan. 5, 2022. https://docs.microsoft.com/en-us/azure/virtual-machines/windows/create-vm-generalized-managed.

Mishra, Bharati; Jena, Debasish et al. Securing Files in the Cloud. 2016 IEEE International Conference on Cloud Computing in Emerging Markets (CCEM). https://ieeexplore.ieee.org/stamp/stamp.jsp?tp=&arnumber=7819669 (Year: 2016).

Shuvo, Arfatul Mowla et al. Storage Efficient Data Security Model for Distributed Cloud Storage. 2020 IEEE 8th R10 Humanitarian Technology Conference (R10-HTC). https://ieeexplore.ieee.org/stamp/stamp.jsp?tp=&arnumber=9356962 (Year: 2020).

Written Opinion of the International Searching Authority for PCT Application No. PCT/IB2022/060940 dated Feb. 1, 2023. The International Bureau of WIPO.

Written Opinion of the International Searching Authority, PCT/IB23/55312. ISA/US Commissioner for Patents, Alexandria, Virginia. Dated Aug. 30, 2023.

Written Opinion of the Searching Authority for PCT/IB2023/050848, dated May 9, 2023. International Bureau of WIPO.

Written Opinion of the Searching Authority of PCT/IB2023/058074, dated Nov. 20, 2023. Searching Authority United States Patent and Trademark Office, Alexandria, Virginia.

Zhang et al. BMC Bioinformatics 2014. "On finding bicliques in bipartite graphs: a novel algorithm and its application to the integration of diverse biological data types". http://www.biomedcentral.com/1471-2105/15/110, 2014.

Jordan, M. et al. Enabling pervasive encryption through IBM Z stack innovations. IBM Journal of Research and Development, vol. 62 Issue: 2/3, https://ieeexplore.ieee.org/stamp/stamp.jsp?tp&arnumber=8270590 (Year: 2018).

Leibenger, Dominik et al. EncFS goes multi-user: Adding access control to an encrypted file system. 2016 IEEE Conference on Communications and Network Security (CNS). https://ieeexoplore.ieee.org/stamp/stamp.jsp?tp=&arnumber=7860544 (Year: 2016).

No stated author; Downdetector; 2020; retrieved from the Internet https://web.archive.org/web/20201226001244/https://downdetector.com/; pp. 1-8, as printed. (Year: 2020).

No stated author; How to Run a Ping Test (Windows) 2020; retrieved from the Internet https://web.archive.org/web/20200811194856/https://support.shaw.ca/t5/internet-articles/how-to-run-a-ping-test-windows/ta-p/6677; pp. 1-6 as printed. (Year: 2020).

No stated author; IsltoownRightNow; 2020; retrieved from the Internet https://web.archive.org/web/20201202121557/ https:// www.isitdownrightnow.com/; pp. 1-2 as printed. (Year: 2020).

Sahil Suneja; Safe Inspection of Live Virtual Machines; IEEE; Year:2017; pp. 97-111.

Siqi Ma; Certified Copy? Understanding Security Risks of Wi-Fi Hotspot based Android Data Clone Services; ACM; Year: 2021; pp. 320-331.

Chang, Bing et al. MobiCeal: Towards Secure and Practical Plausibly Deniable Encryption on Mobile Devices. 2018 48th Annual IEEE/IFIP International Conference on Dependable Systems and Networks (DSN). https://ieeexplore.IEEE.org/stamp/stamp.jsp?tp=&arnumber=8416506 (Year: 2018).

Islam, Md Shihabul et al. Secure Real-Time Heterogeneous IoT Data Management System. 2019 First IEEE International Conference on Trust, Privacy and Security in Intelligent Systems and Applications (TPS-ISA). https://ieeexplore.IEEE.org/stamp/ stamp.jsp?tp=&arnumber=9014355 (Year: 2019).

Safaryan, Olga A et al. Cryptographic Algorithm Implementation for Data Encryption in DBMS MS SQL Server. 2020 IEEE East-West Design & Test Symposium (EWDTS). https://ieeexplore.IEEE.org/stamp/stamp.jsp? tp=&arnumber=9224775 (Year: 2020).

Wassermann, Sarah et al. ViCrypt to the Rescue: Real-Time, Machine-Learning-Driven Video-QoE Monitoring for Encrypted Streaming Traffic. IEEE Transactions on Network and Service Management, vol. 17, Issue: 4. https://ieeexplore.IEEE.org/stamp/ stamp.jsp?tp=&arnumber=9250645 (Year: 2020).

* cited by examiner

TECHNIQUES FOR CYBERSECURITY INSPECTION BASED ON RUNTIME DATA AND STATIC ANALYSIS FROM CLONED RESOURCES

CROSS-REFERENCE TO RELATED APPLICATIONS

This application is a continuation-in-part of U.S. patent application Ser. No. 17/664,508 filed May 23, 2022, now pending, and U.S. patent application Ser. No. 18/457,017 filed Aug. 25, 2023, which itself is a continuation of U.S. Pat. No. 11,841,945 filed Oct. 7, 2022, the contents of which are hereby incorporated by reference.

TECHNICAL FIELD

The present disclosure relates generally to cybersecurity, and specifically to detecting cybersecurity threats based on a combination of runtime data and static analysis, wherein the static analysis is performed on a cloned disk.

BACKGROUND

FIG. 1 is an example diagram 100 of a virtual machine 112 from which a snapshot is generated, according to the prior art. The virtual machine (VM) 112 is deployed as an Azure® VM. The VM 112 includes a plurality of disks allocated to the VM 112. The VM 122 may be deployed only with an OS disk, with an OS disk and a plurality of data disks, and so on. The plurality of disks includes an operating system (OS) disk 102, an optional temporary disk 104, and at least a data disk 106. The OS disk 102 includes a preinstalled OS, such as Microsoft® Windows, or Linux®. The preinstalled OS is in a boot volume of the OS disk 102. The optional temporary disk 104 may be used for storing temporary data, such as page files, swap files, and the like. The data disk 106 may be used for storing an application, application code, libraries, binaries, application data, and the like. In some configurations, a disk of the plurality of disks may be further encrypted. For example, the OS disk 102, and the data disk 106 may be encrypted disks. In certain embodiments an encrypted disk is associated with an encryption key which can be used to decrypt the disk. For example, a VM having a Windows® allocated disk may be configured to encrypt a data disk allocated to the VM using BitLocker. A VM having a Linux® allocated disk may be configured to encrypt a data disk allocated to the VM using DM-Crypt®.

The plurality of disks are allocated to the VM 112 by a disk level provisioning 105. In an embodiment, the disk level provisioning 105 is an application deployed in a cloud computing infrastructure. The disk level provisioning 105 provisions hardware resource to the VM 112 which results in allocation of a disk. The hardware resources are provisioned from cloud storage pages 110 of the cloud computing infrastructure. The hardware resources may be solid state device (SSD) storage, hard disk drive (HDD) storage, optical storage, other magnetic storage, and the like. In an example embodiment, the cloud storage pages 110 are Azure page blobs. A page blob is a collection of a pages, each page having a predetermined size. For example, the predetermined size may be 522-bytes per page.

When a snapshot is created of the VM 112, a disk needs to be selected, as a snapshot is a copy of a disk at a point in time. As a snapshot is based on a single disk, inspection may become complicated when multiple disks are used in coordination. For example, when disk striping is performed between a plurality of disks, coordination needs to be performed between the snapshots. Furthermore, when a disk snapshot 108 is generated, for example, based on the data disk 106, the snapshot process may be interrupted, resulting in pages which need to be deleted by a garbage collection mechanism. Furthermore, the disk snapshot 108 needs to be assigned a permission to an inspector workload, as well as access to an encryption key if the disk from which the snapshot is generated is an encrypted disk.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include configuring a resource deployed in a computing environment to deploy thereon a sensor, the sensor configured to detect runtime data. Method may also include detecting runtime data from the sensor of the resource. Method may furthermore include generating an inspectable disk based on an original disk of the resource. Method may in addition include initiating inspection based on the detected runtime data for a cybersecurity object on the inspectable disk; detecting the cybersecurity object on an inspectable disk; and initiating a mitigation action on the resource. Other embodiments of this aspect include corresponding computer systems, apparatus, and computer programs recorded on one or more computer storage devices, each configured to perform the actions of the methods.

Implementations may include one or more of the following features. Method where generating the inspectable disk further comprises: cloning the original disk into the inspectable disk. Method may include: releasing the inspectable disk in response to completing inspection of the inspectable disk. Method may include: detecting a cybersecurity toxic combination based on the runtime data and the detected cybersecurity object. Method may include: initiating the mitigation action based on the detected cybersecurity toxic combination. Method may include: initiating the mitigation action based on: the detected runtime data, the cybersecurity object, and a combination thereof. Method may include: configuring the sensor to apply a rule on an event detected in the runtime data, the rule including a logical expression and an action; and configuring the sensor to perform the action in response to applying the rule on the event and receiving a predetermined result. Method may include: configuring the sensor to detect the event based on an identifier of the cybersecurity object. Method where the sensor is configured to listen to a data link layer through an extended Berkeley Packet Filter (eBPF) interface. Implementations of the described techniques may include hardware, a method or process, or a computer tangible medium.

In one general aspect, non-transitory computer-readable medium may include one or more instructions that, when executed by one or more processors of a device, cause the device to: configure a resource deployed in a computing environment to deploy thereon a sensor, the sensor configured to detect runtime data; detect runtime data from the sensor of the resource; generate an inspectable disk based on an original disk of the resource; initiate inspection based on the detected runtime data for a cybersecurity object on the inspectable disk detect the cybersecurity object on an inspectable disk; and initiate a mitigation action on the resource. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: configure a resource deployed in a computing environment to deploy thereon a sensor, the sensor configured to detect runtime data. System may in addition detect runtime data from the sensor of the resource. System may moreover generate an inspectable disk based on an original disk of the resource. System may also initiate inspection based on the detected runtime data for a cybersecurity object on the inspectable disk. System may furthermore detect the cybersecurity object on an inspectable disk. System may in addition initiate a mitigation action on the resource. Other embodiments of this aspect include corresponding computer systems, apparatus, and computer programs recorded on one or more computer storage devices, each configured to perform the actions of the methods.

Implementations may include one or more of the following features. System where the memory contains further instructions that, when executed by the processing circuitry for generating the inspectable disk, further configure the system to: clone the original disk into the inspectable disk. System where the memory contains further instructions which when executed by the processing circuitry further configure the system to: release the inspectable disk in response to completing inspection of the inspectable disk. System where the memory contains further instructions which when executed by the processing circuitry further configure the system to: detect a cybersecurity toxic combination based on the runtime data and the detected cybersecurity object. System where the memory contains further instructions which when executed by the processing circuitry further configure the system to: initiate the mitigation action based on the detected cybersecurity toxic combination. System where the memory contains further instructions which when executed by the processing circuitry further configure the system to: initiate the mitigation action based on: the detected runtime data, the cybersecurity object, and a combination thereof. System where the memory contains further instructions which when executed by the processing circuitry further configure the system to: configure the sensor to apply a rule on an event detected in the runtime data, the rule including a logical expression and an action; and configure the sensor to perform the action in response to applying the rule on the event and receiving a predetermined result. System where the memory contains further instructions which when executed by the processing circuitry further configure the system to: configure the sensor to detect the event based on an identifier of the cybersecurity object. System where the sensor is configured to listen to a data link layer through an extended Berkeley Packet Filter (eBPF) interface. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
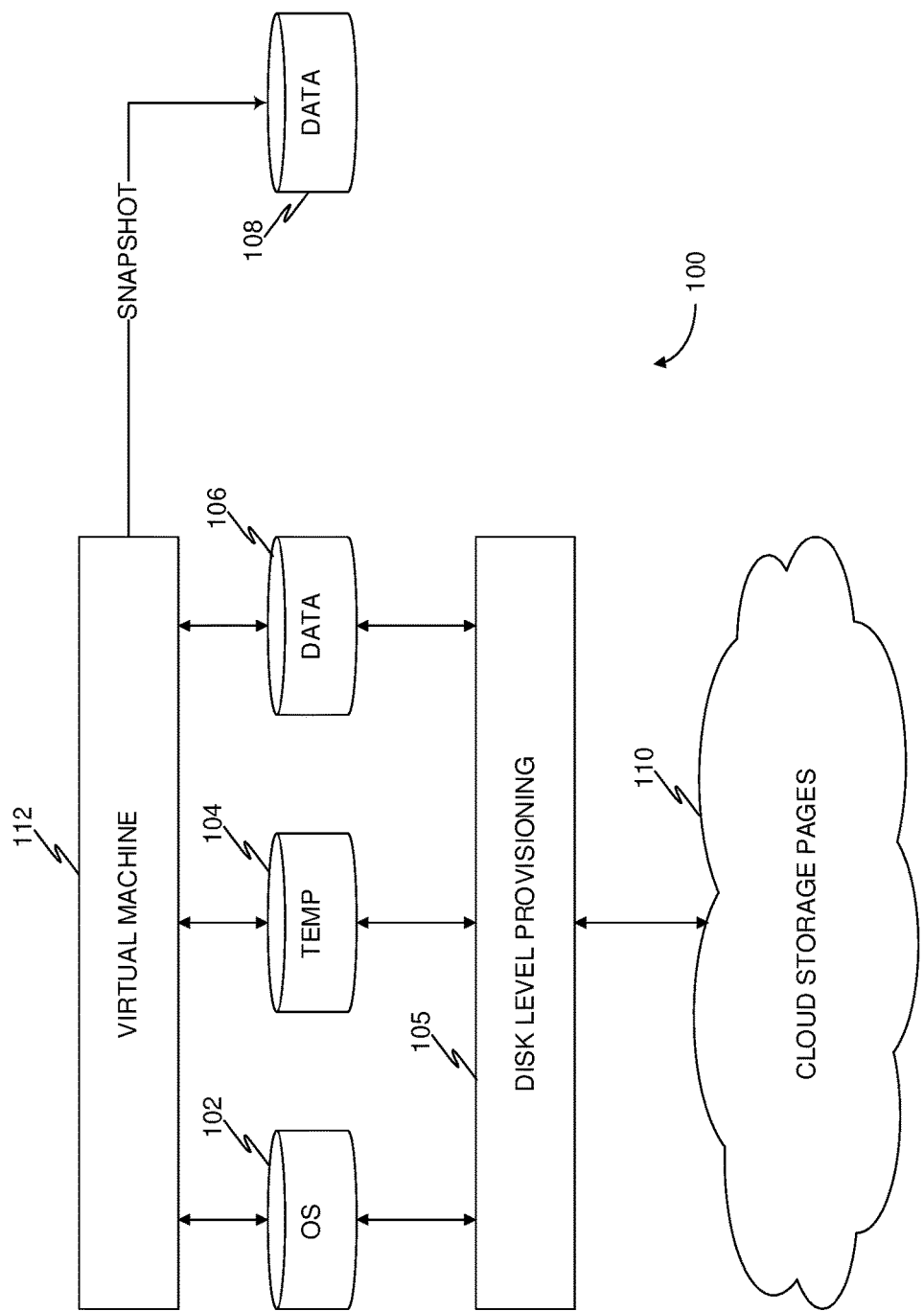
FIG. 1 is an example diagram of a virtual machine from which a snapshot is generated, according to the prior art.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 2:
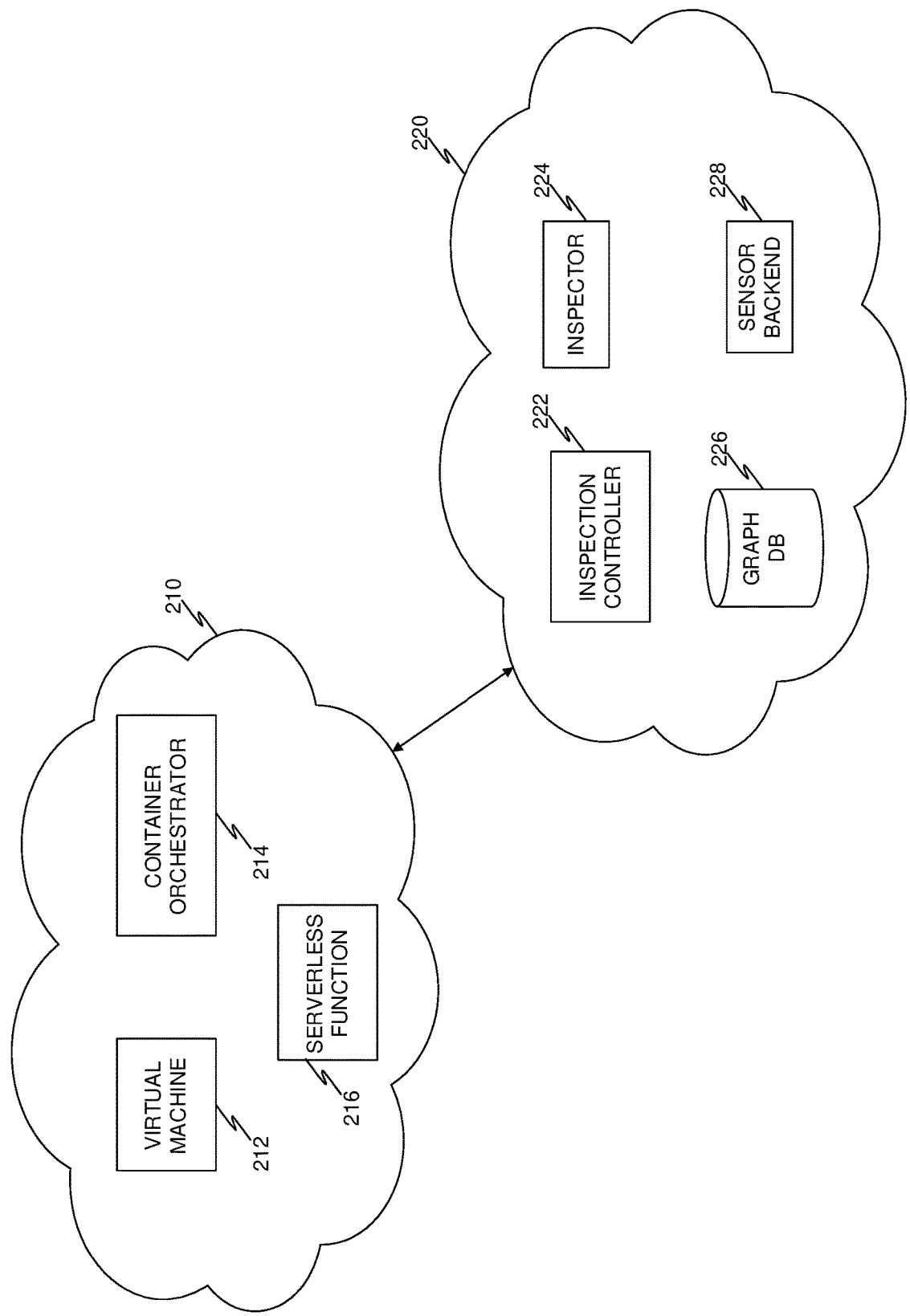
FIG. 2 is an example schematic diagram of a cloud computing environment monitored for a cybersecurity threat by an inspection environment, implemented in accordance with an embodiment.

FIG. 2 is an example schematic diagram of a cloud computing environment monitored for a cybersecurity threat by an inspection environment, implemented in accordance with an embodiment. In an embodiment, a cloud computing environment 210 is implemented as a virtual private cloud (VPC), Virtual Network (VNet), and the like, over a cloud computing platform. A cloud computing platform may be provided, for example, by Amazon® Web Services (AWS), Google® Cloud Platform (GCP), Microsoft® Azure, and the like. A cloud computing environment 210 includes cloud entities deployed therein. A cloud entity may be, for example, a principal, a resource, a combination thereof, and the like. In an embodiment, a resource is a cloud entity which provides access to a compute resource, such as a processor, a memory, a storage, and the like. In some embodiments a resource is a virtual machine, a software container, a serverless function, and the like. A resource may be, or may include, a software application deployed thereon, such as a webserver, a gateway, a load balancer, a web application firewall (WAF), an appliance, and the like.

In certain embodiments, a principal is a cloud entity which is authorized to initiate actions in the cloud computing environment. A cloud entity may be, for example, a user account, a service account, a role, and the like. In some embodiments, a cloud entity is a principal relative to another cloud entity, and a resource to other cloud entities. For example, a load balancer is a resource to a user account requesting a webpage from a webserver behind the load balancer, and the load balancer is a principal to the webserver.

The cloud computing environment 210 includes a plurality of resources, such as virtual machine 212, software container orchestrator 214, and serverless function 216. A virtual machine 212 may be deployed, for example, utilizing Oracle® VirtualBox®. A software container orchestrator 214 may be deployed, for example, utilizing a Docker® engine, a Kubernetes® engine, and the like. In an embodiment, a software container orchestrator 214 is configured to deploy a software cluster, each cluster including a plurality of nodes. In an embodiment, a node includes a plurality of pods. A serverless function 216, may be, for example, utilized with Amazon® Lambda. In an embodiment, the serverless function 216 is a serverless function container image.

Each such resource is susceptible to various cybersecurity threats. Such threats can become apparent for example due to a software version of an application in a software container 214, an operating system (OS) version of a virtual machine 212, a misconfiguration in code of a serverless function 216, and the like. The cloud computing environment 210 is monitored for cybersecurity threats by an inspection environment 220. In an embodiment, the inspection environment is implemented as a cloud computing environment, such as a VPC, VNet, and the like.

In an embodiment, each of the virtual machine 212, the software container 214, and the serverless function 216 include a sensor configured to a particular resource, resource type, combination thereof, and the like. An example deployment of a sensor is discussed in more detail in FIG. 3 below.

In an embodiment, the sensor (not shown in FIG. 2) is configured to listen for events, packets, and the like, on a data link layer. For example, the sensor is configured to utilize an eBPF interface, which allows non-intrusive monitoring of the data link layer communication. In certain embodiments, the sensor is further configured to send data to and receive data from a sensor backend server 228. The sensor backend server 228 is a workload, such as a virtual machine, software container, serverless function, combination thereof, and the like, which is deployed in the inspection environment 220.

In an embodiment, the sensor backend server 228 is configured to receive sensor generated data. For example, the sensor backend server 228 is configured, in an embodiment, to receive events from a sensor.

In some embodiments, the sensor is configured to request from the sensor backend server 228 rules, definitions, and the like, which the sensor is configured to apply to events, for example as detected on an eBPF interface. For example, a predetermined event, such as indicating access to an IP address, IP address range, and the like, may be checked against a definition.

According to an embodiment, a definition is a logical expression which, when applied to an event, yields a "true" or "false" result. In an embodiment, a rule is a logical expression which includes an action. For example, a rule may be that if a certain definition is true when applied to an event, data pertaining to the event should be sent to the sensor backend server 228.

In some embodiments, the sensor backend server 228 is configured to initiate inspection of a resource deployed in the cloud computing environment 210. For example, the sensor backend server 228 may be configured to initiate such inspection in response to receiving an event, data, a combination thereof, and the like, from a sensor deployed on a resource. In an embodiment, initiating inspection of a resource is performed by generating an instruction for an inspection controller 222, the instruction, when executed, configures an inspector 224 to inspect the resource.

For example, a sensor is configured to send event data to the sensor backend server 228 in response to detecting that a definition, applied by the sensor to a detected event, results in a "true" value when applied. As an example, the definition may be "is the IP address in the range of 227.0.0.1 through 227.0.0.99", which in this example corresponds to an IP address range used by a malware, such as a cryptominer. When the definition is applied, for example to a detected network packet, and the result is "true", the sensor is configured to send data pertaining to the event to the sensor backend server 228. Data pertaining to the event may be, for example, an IP address, an event type, combinations thereof, and the like.

In an embodiment, the sensor backend server 228 is configured to receive the data. In some embodiments, the sensor backend server 228 is further configured to apply a rule to the received data to determine if an inspection of the workload on which the sensor is deployed should be inspected for a cybersecurity threat. For example, the sensor backend server 228 is configured to generate an instruction to inspect a virtual machine 212, in response to receiving an indication from a sensor deployed as service on the virtual machine that a communication has been detected between the virtual machine 212 and a server having an IP address which is a forbidden IP address, such as an IP address associated with a malware.

For example, the sensor backend server 228 may generate an instruction for the inspection controller 222, which when executed by the inspection controller generates an inspectable disk, for example utilizing a snapshot, a copy, a clone, and the like of a disk (not shown) associated with the virtual machine 212, and provides access to an inspector 224 to the inspectable disk.

In an embodiment the inspector 224 is configured to detect a cybersecurity threat. For example, the inspector 224 is configured to receive, in an embodiment, a hash of an application stored on the inspectable disk, and determine if the hash matches a hash of known malware applications. In certain embodiments, the inspector 224 is provided with a persistent volume claim (PVC) to the inspectable disk.

In some embodiments, the sensor is configured to generate a hash of an application on the resource, such as the virtual machine 212, on which it is deployed, and send the hash to the sensor backend server 228. The received hash may then be compared, for example by providing it to the inspector 224, with known hash values which correspond to malware applications.

While the examples above discuss malware and cryptominers, it is readily apparent that the sensor and inspector 224 may be utilized to detect other types of cybersecurity threats, such as an exposure, a vulnerability, a weak password, an exposed password, a misconfiguration, and the like.

In certain embodiments, the inspection environment 220 further includes a graph database 226, on which a security is stored. In an embodiment, the security graph is configured to store a representation of a cloud computing environment, such as cloud computing environment 210. For example, the representation may be based on a predefined unified data schema, so that each different cloud platform may be represented using a unified data schema, allowing for a unified representation. For example, a principal may be represented by a predefined data structure, each principal represented by a node in the security graph. Likewise, a resource may be represented by another predefined data structure, each resource represented by a node in the security graph.

In certain embodiments, data received from a sensor deployed on a resource in the cloud computing environment may be stored in the graph database as part of the security graph. In the example above, in response to receiving data from the sensor which indicates a potential malware infection of the virtual machine 212, the sensor backend server 228 is configured, in an embodiment, to: generate a node representing the malware in the security graph, generate a node in the security graph representing the virtual machine 212, and connect the node representing the malware with the node representing the virtual machine 212.

Figure 3:
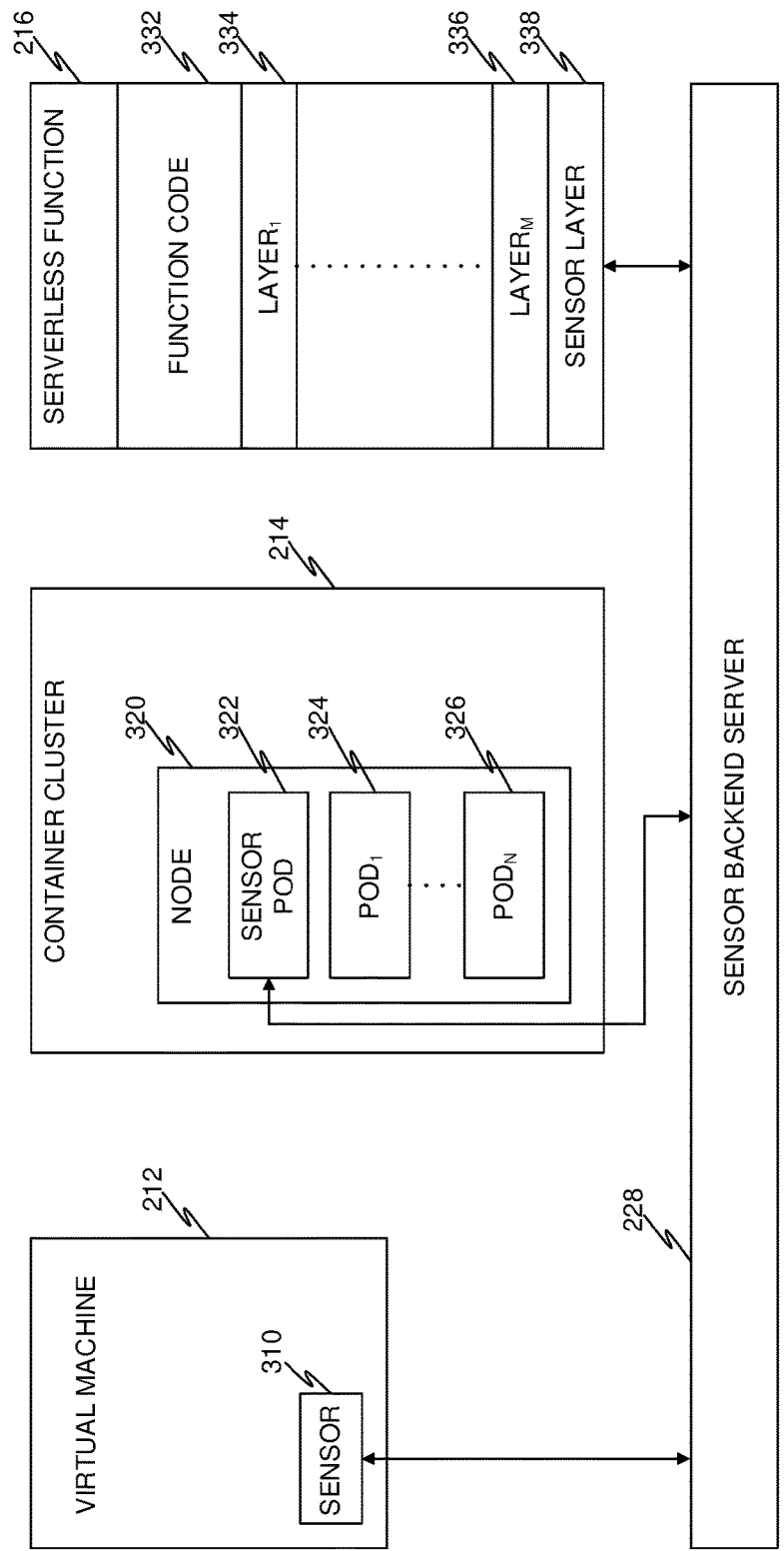
FIG. 3 is an example schematic illustration of a sensor backend server communicating with a plurality of sensors deployed on various workloads, implemented in accordance with an embodiment.

FIG. 3 is an example schematic illustration of a sensor backend server communicating with a plurality of sensors deployed on various workloads, implemented in accordance with an embodiment. In some embodiments, a sensor backend server 228 is configured to communicate with a machine (not shown) having a sensor installed thereon and communicatively coupled with the sensor backend server 228. In an embodiment, the machine is bare metal machine, a computer device, a networked computer device, a laptop, a tablet, and the like computing devices.

In an embodiment, a sensor backend server 228 is implemented as a virtual machine, a software container, a serverless function, a combination thereof, and the like. In certain embodiments, a plurality of sensor backend servers 228 may be implemented. In some embodiments where a plurality of sensor backend servers 228 are utilized, a first group of sensor backend servers of the plurality of sensor backend servers is configured to communicate with a sensor deployed on a first type of resource (e.g., virtual machine), a second group of sensor backend servers is configured to communicate with resources of a second type, etc. In an embodiment, a first group of sensor backend servers is configured to communicate with sensors deployed on a first cloud computing environment deployed on a first cloud platform (e.g., AWS) and a second group of sensor backend servers is configured to communicate with sensors deployed on resources in a second cloud computing environment deployed on a second cloud platform (e.g., GCP).

A virtual machine 212 includes a sensor 310. In an embodiment, the sensor 310 is deployed as a service executed on the virtual machine 212. In some embodiments, a virtual machine 212 is configured to request binary code, a software package, and the like, for example from a sensor backend server 228, which when executed by the virtual machine 212 cause a sensor 310 to run as a service on the virtual machine 212. The sensor 310 is configured to listen to a data link layer communication, for example through an eBPF interface.

A container cluster 214 runs a daemonset, and includes a plurality of nodes, such as node 320. The daemonset ensures that each node 320 runs a daemonset pod 322, which is configured as a sensor. For example, a Kubernetes® cluster may execute a daemonset configured to deploy a daemonset pod on each deployed node, wherein the daemonset pod is configured to listen to a data link layer communication, for example through an eBPF interface, to communication of a plurality of pods, such as pod-1 324 through pod-N 326, where 'N' is an integer having a value of '1' or greater. The daemonset pod 322 is configured, in an embodiment, to communicate with the sensor backend server 228.

A serverless function 216 includes, in an embodiment, a function code 332, and a plurality of code layers 1 through M (labeled respectively as 334 through 336), where 'M' is an integer having a value of '1' or greater. For example, in AWS Lambda a layer contains, in an embodiment, code, content, a combination thereof, and the like. In some embodiments, a layer, such as layer 334 includes runtime data, configuration data, software libraries, and the like.

In certain embodiments, the serverless function 216 includes a sensor layer 338. The sensor layer 338 is configured, in an embodiment, to listen to a data link layer communication of the serverless function 216, for example through an eBPF interface.

The sensor service 310, daemonset pod 322, and sensor layer 338 are each an implementation of a sensor, according to an embodiment. In an embodiment, a sensor is configured to communicate with a sensor backend server 228 through a transport layer protocol, such as TCP. For example, the sensor backend server 228 is configured, in an embodiment, to listen to a predetermined port using a TCP protocol, and a sensor, such as sensor 310, daemonset pod 322, and sensor layer 338 are each configured to communicate with the backend sensor server 328, for example by initiating communication using TCP over the predetermined port.

Figure 4:
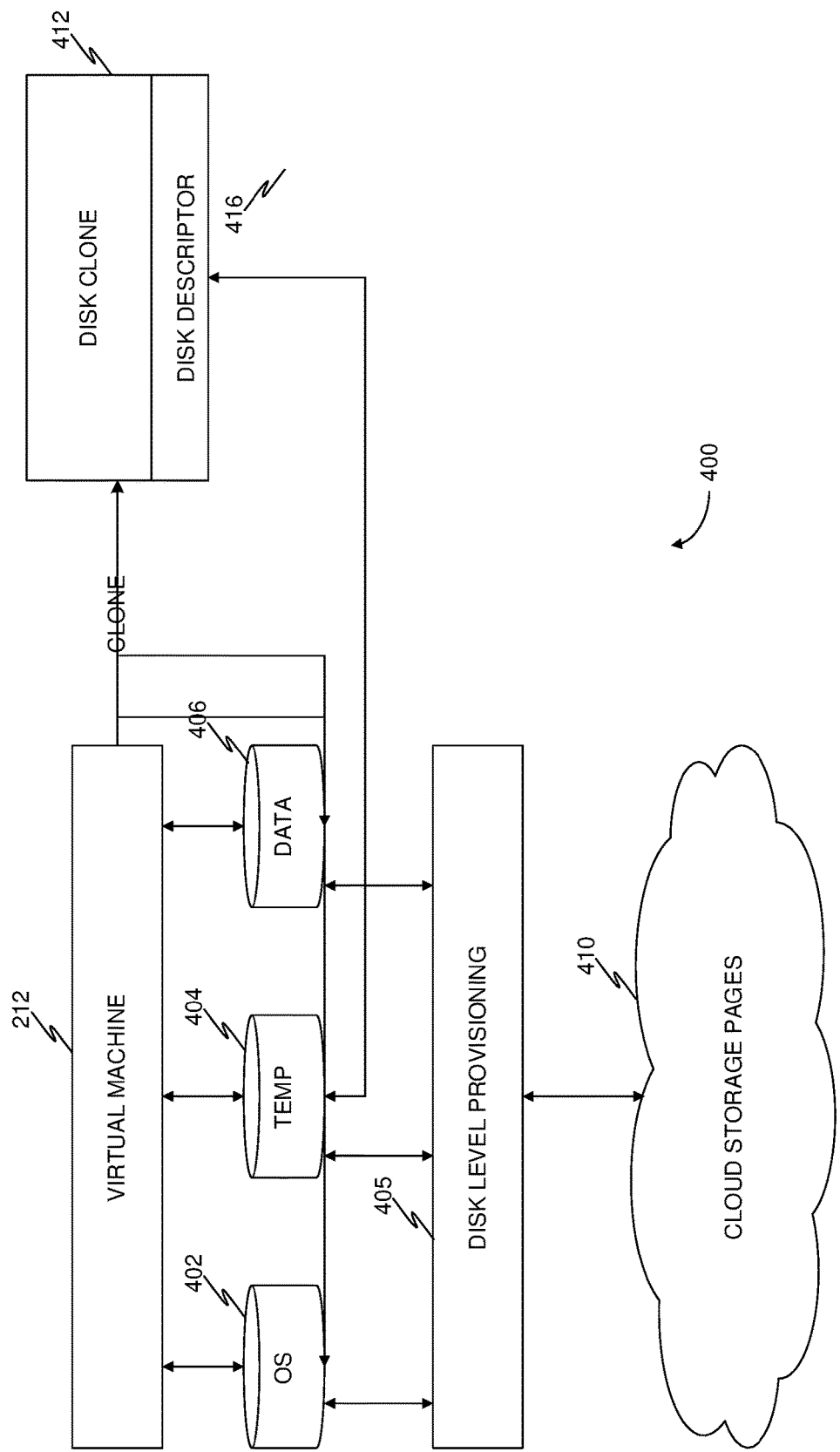
FIG. 4 is an example diagram of a virtual machine and a cloned disk thereof, utilized to describe an embodiment.

FIG. 4 is an example diagram 400 of a virtual machine 212 and a cloned disk thereof, utilized to describe an embodiment. While an Azure® cloud computing infrastructure is discussed here, it should be understood that the teachings herein apply equally to other cloud computing infrastructures which offer equal functionality. The VM 212 includes a plurality of disks allocated to the VM 212. The VM 212 may be deployed only with an OS disk, with an OS disk and a plurality of data disks, and so on.

In this example embodiment the plurality of disks includes an operating system (OS) disk 402, an optional temporary disk 404, and at least a data disk 406. The OS disk 402 includes a preinstalled OS, such as Microsoft® Windows, or Linux®. The preinstalled OS is in a boot volume of the OS disk 402. The optional temporary disk 404 may be used for storing temporary data, such as page files, swap files, and the like. The data disk 406 may be used for storing an application, application code, libraries, binaries, application data, and the like. In an embodiment, a plurality of data disks 406 may be allocated to the VM 212. In some configurations, a disk of the plurality of disks may be encrypted. For example, the OS disk 402, and the data disk 406 may be encrypted disks. In certain embodiments an encrypted disk is associated with an encryption key which can be used to decrypt the disk. For example, a VM having a Windows® allocated disk may be configured to encrypt a data disk allocated to the VM using BitLocker. A VM having a Linux® allocated disk may be configured to encrypt a data disk allocated to the VM using DM-Crypt®.

The plurality of disks are allocated to the VM 212 by a disk level provisioning 405. In an embodiment, the disk level provisioning 405 is an application deployed in a cloud computing infrastructure. The disk level provisioning 405 provisions hardware resource to the VM 212 which results in allocation of a disk. The hardware resources are provisioned from cloud storage pages 410 of the cloud computing infrastructure. The hardware resources may be solid state device (SSD) storage, hard disk drive (HDD) storage, optical storage, other magnetic storage, and the like. In an example embodiment, the cloud storage pages 410 are Azure page blobs. A page blob is a collection of a pages, each page having a predetermined size. For example, the predetermined size may be 512-bytes per page.

A disk clone 412 (also referred to as cloned disk 412) includes a disk descriptor which includes a reference to an address of a disk of the VM 212. In certain cloud computing infrastructures, when a disk is cloned, a pointer, such as pointer 416 is used to point to an original disk, in this example the data disk 406. In an embodiment, this may be achieved by dereferencing a pointer of the VM 212 which points to the data disk 406, and generating the pointer 416 for the cloned VM 412 to point to the data disk 406. In certain embodiments where a disk is encrypted, a pointer may be generated for the cloned VM 412 to the encryption key.

In an embodiment, the cloning process generates the disk clone 412 as a background process. This is possible due to utilizing diffs. A diff is an additional content that includes the difference between a content at one point in time (e.g., when the original disk was cloned) and a second, later, point in time. Thus, the VM 212 may access the data disk 406 and any diffs generated, or committed, after the disk clone 412 is generated, whereas the disk clone 412 may access only the content of the original data disk 406, and cannot access any diffs generated since.

The cloned disk 412 may then be inspected by an inspector, such as the inspector 224 of the inspection environment 220 of FIG. 2 above. In some embodiments, a cloud computing infrastructure may be divided into regions, corresponding to geographic regions. In such embodiments, cloning a disk may be possible only if the disk clone is in the same region as the original disk from which the clone is generated. In an embodiment an inspection controller, such as the controller 222 of FIG. 2, is configured to determine if inspecting a virtual instance requires generating a disk clone or a snapshot. In an embodiment, the determination is performed based on the geographic location of the VM 212, an intended geographic location into which a disk of the VM 212 is cloned, a geographic location of the inspection environment, a number of disks allocated to the virtual instance, or any combination thereof.

By inspecting a cloned disk 412 there is no need to generate a snapshot, which prevents at least some of the deficiencies noted above. Furthermore, cloning is performed on a live virtual instance, which remains live during inspection, as the cloning does not interfere with the virtual instance's operation. Once inspection of the cloned disk 412 is complete, the cloned disk 412 may be spun down, releasing any resources allocated to it, and removing the pointers pointing to the disks of the virtual machine. In an embodiment, the cloned disk 412 may be deleted to accomplish spinning down.

Figure 5:
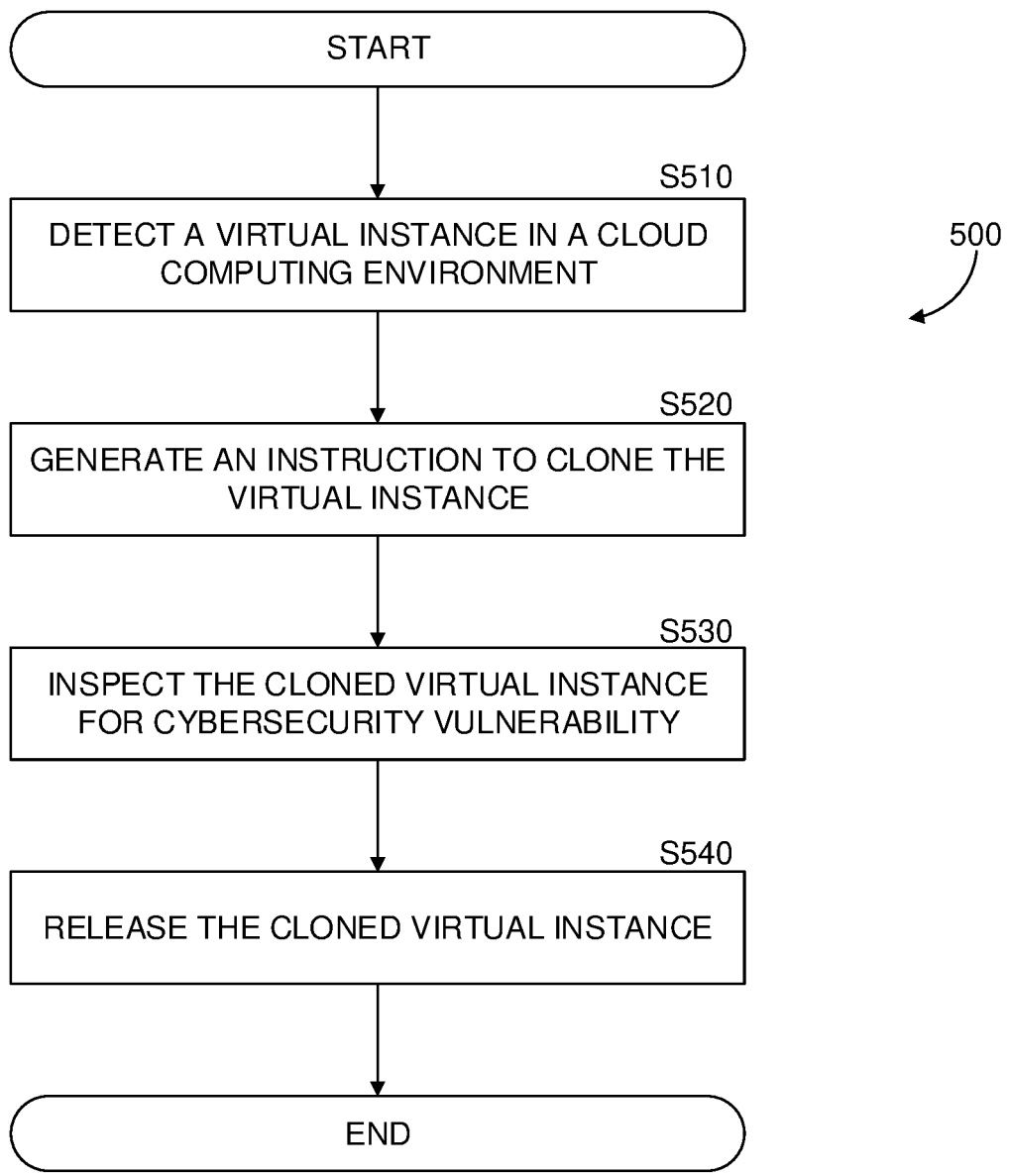
FIG. 5 is an example flowchart of a method for generating a disk clone of a virtual instance for vulnerability inspection according to an embodiment.

FIG. 5 is an example flowchart 500 of a method for generating a disk clone of a virtual instance for vulnerability inspection according to an embodiment.

At S510, a live virtual instance is detected in a cloud computing environment. A live virtual instance is a virtual instance which, at the time of detection, is deployed in a production environment. A production environment is a cloud computing environment which provides services and resources, for example, to users of the cloud computing environment. This is an environment which is distinct, for example, from a test environment in which applications, appliances, code, and the like, are tested, before being deployed in a production environment for general use.

In an embodiment, an application programming interface (API) of a cloud computing environment may be queried to detect virtual instances deployed therein. In other embodiments, a security graph may be queried to detect virtual instances deployed in the cloud computing environments. The security graph, which includes a representation of the cloud computing environment, may be queried to detect virtual instances based on at least an attribute. The at least an attribute may be, for example, a type of virtual instance (e.g., virtual machine, container, etc.), a region in which the virtual instance is deployed, a tag indicating that the virtual instance should be inspected, and the like.

In an embodiment, detecting a virtual instance further includes determining an identifier of the virtual instance, such as a name, network address, and the like. The identifier may be used to access the virtual instance. The virtual instance includes a disk (also referred to as original disk). In some embodiments, the disk is represented as a node in the security graph, the node connected to another node, the another node representing the virtual instance.

In certain embodiments, detecting a live virtual instance includes receiving an identifier of the live virtual instance, and an instruction to inspect the live virtual instance.

At S520, an instruction is generated which, when executed, configures the cloud computing environment to clone the disk of the virtual instance. In an embodiment, the instruction is generated for execution by an orchestrator of the cloud computing environment in which the virtual instance, also called a parent virtual instance, is deployed. When executed, the instruction configures, for example, the cloud computing environment, to allocate resources to a cloned disk. The cloned disk is an independent copy of the original disk of the parent virtual instance. An independent copy of a disk is a copy which can be deployed and accessed independently of the original disk. This is as opposed to a copy of a virtual instance, such as a snapshot, which requires additional resources allocated in order to deploy.

For example, a snapshot may be generated based off of a single disk of a virtual instance. A new disk (e.g., persistent volume) may be generated based off of the snapshot, and a claim (e.g., persistent volume claim) generated to another virtual instance in order to access data stored on the new disk. Furthermore, a snapshot is only available once the disk is completely copied. In contrast, a clone is available immediately as the operation of generating a disk descriptor is faster than an operation of generating a snapshot. For at least this reason inspection is completed faster.

In certain embodiments, the instruction, when executed, configures the cloud computing environment to generate a cloned disk having a reference, such as a pointer, to the original disk of the parent virtual instance. In some embodiments, the disk is encrypted with an encryption key. The encryption key, as well as the disk, may be dereferenced. Dereferencing an encryption key (or a disk) may include determining where a pointer of the parent virtual instance is pointing to, e.g., the pointer points to a block address of a managed block storage. A new pointer may be stored for the cloned disk which points to the same block address, encryption key, etc. as the dereferenced pointer.

In some embodiments, an optional check is performed to determine if the cloned disk is configured to be deployed in a same region as the parent virtual instance. A cloud computing infrastructure may limit the ability to clone a disk outside of a region. For example, if an inspection environment is not in the same region as the cloud computing environment in which the virtual instance is inspected, it may not be possible (i.e., not permissible) to generate a disk clone in the region where the inspection environment is.

In other embodiments, an optional check may be performed to determine the number of disks associated with a virtual instance. For example, if the number of disks equals or exceeds a predetermined threshold the cloning process may be initiated, otherwise a snapshot is generated, and inspection is performed on the generated snapshot.

At S530, the cloned disk is inspected for cybersecurity threats. In an embodiment, cybersecurity threats include, but are not limited to, exposures, vulnerabilities, malware, ransomware, spyware, bots, weak passwords, exposed passwords, exposed certificates, outdated certificates, misconfigurations, suspicious events, and the like.

Inspecting a cloned disk includes, in an embodiment, assigning an inspector to the cloned disk. In some embodiments, an inspector, such as inspector 224 of FIG. 2, is provided with access to the cloned disk. For example, the cloning process may include generating an instruction which when executed configures the cloned disk to allow an inspector workload access thereto. The inspector may inspect the cloned disk for security objects, such as files, folders, and the like. A security object may be, for example, a password stored in plaintext, a password stored in cleartext, a certificate, and the like.

For example, in an embodiment, a signature for a file, folder, and the like is generated during an inspection. Such a signature is matched to another known signature. The known signature indicates a vulnerability. A signature may be generated, for example, using a checksum.

At S540, the cloned disk is released. In an embodiment, an instruction may be generated which, when executed, configures the cloud computing environment to release the cloned disk. Releasing a cloned disk may include, for example, deprovisioning resources allocated to the cloned disk. For example, a cloned disk may be deleted. Releasing the cloned disk is performed in response to completing the inspection.

While virtual machines are discussed throughout this disclosure, it should be understood that the teachings herein apply equally to other virtual instances with respect to cloning and snapshot generation.

Figure 6:
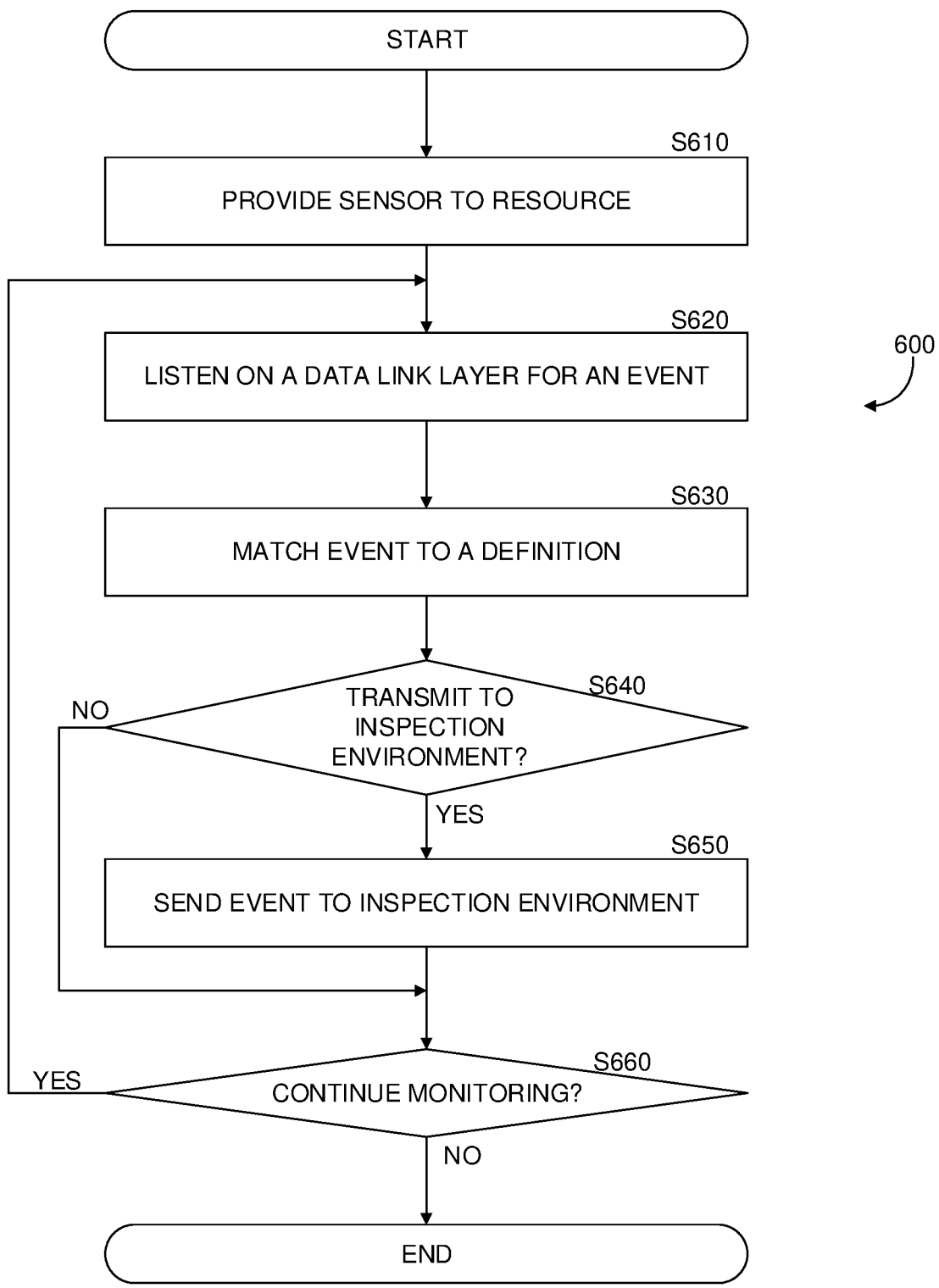
FIG. 6 is an example flowchart of a method for performing cybersecurity threat detection on a resource in a cloud computing environment, implemented in accordance with an embodiment.

FIG. 6 is an example flowchart 600 of a method for performing cybersecurity threat detection on a resource in a cloud computing environment, implemented in accordance with an embodiment.

At S610, a resource is provided with a sensor software. In an embodiment, the resource is any one of a virtual machine, a software container, a serverless function, and the like. In certain embodiments, the sensor software is provided based on the resource type. For example, a virtual machine is provided with a software package, such as an executable code, for example a binary code. A software container engine is provided with a daemonset, so that, in an embodiment where a node is deployed in a cluster of the software container engine, the node includes a daemonset pod which is configured to provide the functionality of a sensor, for example such as detailed above. In an embodiment, a serverless function is provided with a sensor layer by providing a code for example in a .ZIP file.

In an embodiment, providing a sensor includes configuring a resource, such as a virtual machine, software container, serverless function, and the like, to receive software which, when executed, configures the resource to deploy a sensor thereon.

At S620, an event is detected from a data link layer communication. In an embodiment, the data link layer is monitored through an eBPF interface for events. In certain embodiments, a software bill of materials (SBOM) is generated. An SBOM may be implemented as a text file, which is based off of events which were detected, for example through the eBPF interface. In an embodiment, an SBOM includes an identifier of a library which is accessed in runtime, an identifier of a binary which is accessed in runtime, an image of which an instance is deployed in runtime, a port which is accessed by a runtime program, a cryptographic hash function value (such as an SHA1, SHA2, and the like values), and the like. For example, an SBOM may include:

```
programs {
    exe_name: "/usr/sbin/rpc.mountd"
    last_seen: 1663138800
    exe_size: 133664
    exe_sha1: "200f06c12975399a4d7a32e171caabfb994f78b9"
    modules {
        path: "/usr/lib/libresolv-2.32.so"
        last_seen: 1663138800
    }
    modules {
        path: "/usr/lib/libpthread-2.32.so"
        last_seen: 1663138800
    }
    modules {
        path: "/usr/lib/ld-2.32.so"
        last_seen: 1663138800
    }
    modules {
        path: "/usr/lib/libc-2.32.so"
        last_seen: 1663138800
    }
    modules {
        path: "/usr/lib/libtirpc.so.3.0.0"
        last_seen: 1663138800
    }
    modules {
        path: "/usr/lib/libnss_files-2.32.so"
        last_seen: 1663138800
    }
    modules {
        path: "/usr/sbin/rpc.mountd"
        last_seen: 1663138800
    }
    listening_sockets {
        ip_addr: "0.0.0.0"
        port: 60311
    }
    listening_sockets {
        ip_addr: "0.0.0.0"
        port: 43639
    }
}
```

This portion of an SBOM indicates that a remote procedure call (RPC) is executed, which is configured to receive a client request to mount a file system.

At S630, the event is matched to a definition. In some embodiments, a definition includes a logical expression, which when applied to an event results in a "true" or "false" value. For example, a definition may state "software library xyz is accessed", with a result being either true or false, when applied to an event. In some embodiments, a rule is applied to an event. In an embodiment, a rule is a logical expression which further includes an action. For example, a rule states, in an embodiment, "IF software library xyz is accessed by UNKNOWN SOFTWARE, generate an alert". In this example, where an event is detected in which a software having an unknown identifier, for example which does not match a list of preapproved identifiers, attempts to access software library xyz, an alert is generated to indicate that such access is performed.

At S640, a check is performed to determine if data should be transmitted to an inspection environment. In some embodiments, the check is performed by applying a rule to an event, and determining transmission based on an output of applying the rule. If 'yes', execution continues at S650, if 'no' execution continues at S660.

At S650, data respective of an event is transmitted to an inspection environment. In an embodiment, the data is based on an SBOM file. In some embodiments, the data includes event data, such as an identifier of a resource (e.g., virtual machine, software container, serverless function, etc.), an identifier of an application, a hash value, a uniform resource locator (URL) request, a software library identifier, a software binary file identifier, a timestamp, and the like.

At S660, a check is performed to determine if monitoring of the resource should continue. For example, a daemonset of a container may be configured to periodically deploy a daemonset pod to monitor pods in a node. As another example, a virtual machine may be configured to periodically deploy a sensor service which runs as a process on the virtual machine, terminate the process after a predetermined period of time, terminate the process after a predetermined number of detected events, and the like. In some embodiments, the check is performed based on a predetermined amount of elapsed time (e.g., every four hours, every day, twice a day, etc.). If 'yes', execution continues at S620. If 'no', in an embodiment execution terminates. In some embodiments, if 'no', another check is performed at S660, for example after a predetermined period of time has lapsed.

Figure 7:
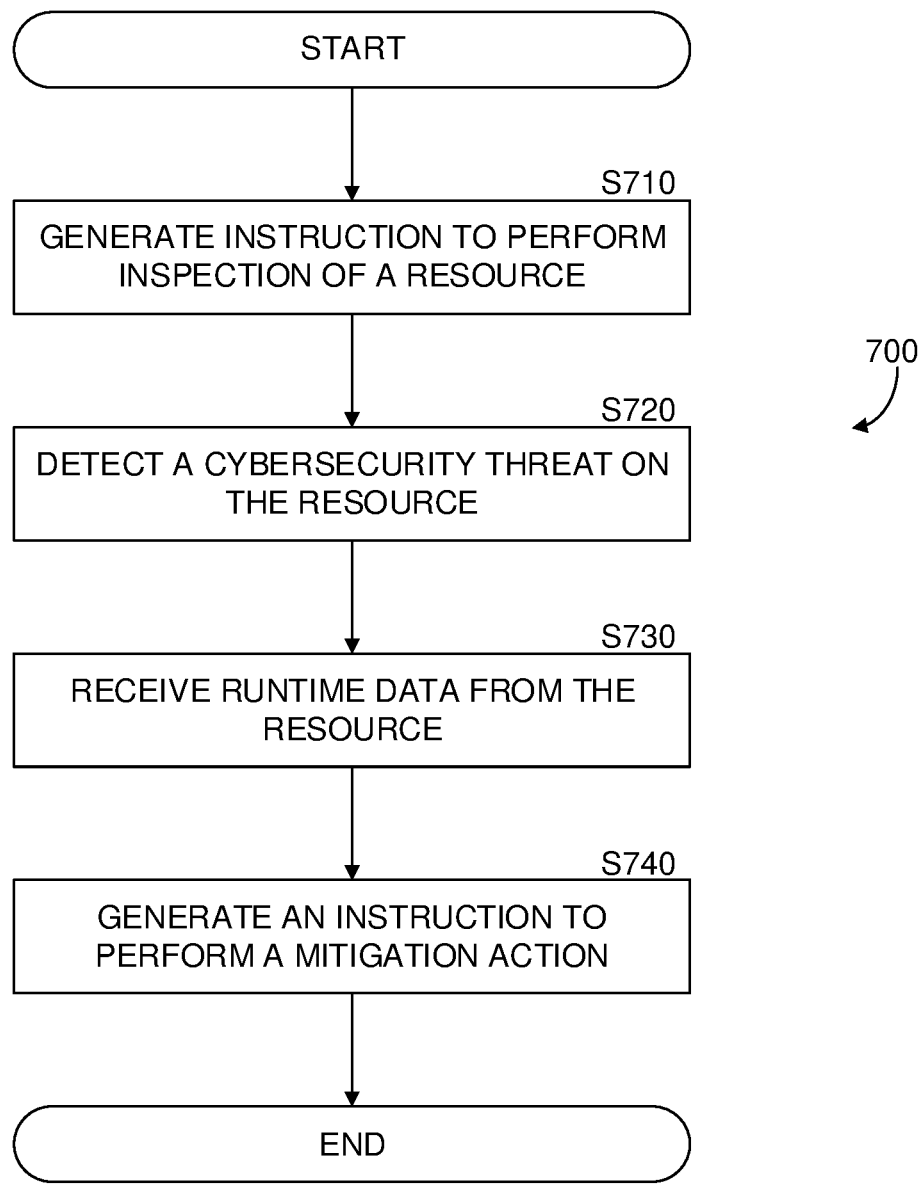
FIG. 7 is an example flowchart of a method for mitigating a cybersecurity threat, implemented in accordance with an embodiment.

FIG. 7 is an example flowchart 700 of a method for mitigating a cybersecurity threat, implemented in accordance with an embodiment.

At S710, an instruction to perform inspection is generated. In an embodiment, inspection is performed on a resource, which may be, for example, a virtual machine, a software container, a serverless function, and the like. In an embodiment, the instruction, when executed, generates an inspectable disk based on a disk of a resource. For example, in an embodiment an inspectable disk is generated by performing a snapshot, a clone, a copy, a duplicate, and the like, of a disk attached to a virtual machine. The inspectable disk is accessible by an inspector. In an embodiment, the inspector utilizes static analysis techniques, for example to detect cybersecurity objects, such as a password, a certificate, an application binary, a software library, a hash, and the like.

The detected cybersecurity objects, cybersecurity threats, and the like, are represented, in an embodiment, in a security graph. For example, a node is generated in an embodiment to represent a malware object. The node representing the malware object is connected to a node representing the resource on which an inspector detected the malware object, to indicate that the malware object is present on the resource.

At S720, a cybersecurity threat is detected. In an embodiment, a cybersecurity threat is detected in response to detecting a cybersecurity object on a disk. In certain embodiments, a cybersecurity threat is an exposure, a vulnerability, a misconfiguration, a malware code object, a hash, a combination thereof, and the like. In some embodiments, a hash, which is detected or generated, is compared to another hash of a list of hashes which indicate know cybersecurity threats. For example, malware code objects are often detected by generating hashes of code objects and comparing them to hashes stored in a database of known hashes which are associated with malicious software. In certain embodiments, the cybersecurity threat is a potential cybersecurity threat. In an embodiment, runtime data is utilized to determine if the potential cybersecurity threat is an actual cybersecurity threat.

At S730, runtime data is received. In an embodiment, the runtime data is received from the inspected resource. In certain embodiments, runtime data is received based on cybersecurity objects detected by static analysis methods performed on the resource. For example, an inspector accessing an inspectable disk which is generated based on a disk of a virtual machine deployed in a cloud computing environment detects application libraries, which are cybersecurity objects. In an embodiment a definition is generated based on the detected cybersecurity objects. For example, a cybersecurity object may be a binary of application "xyz". A definition is generated based on the detected cybersecurity object, for example "Application xyz is deployed in runtime". In an embodiment, a rule is generated, for example based on the definition, further stating "IF application xyz is deployed in runtime, THEN perform mitigation action".

At S740, an instruction to perform a mitigation action is generated. In an embodiment, the instruction, when executed, initiates a mitigation action in the cloud computing environment in which the resource is deployed. In some embodiments, the mitigation action is generated based on the detected cybersecurity threat and the received runtime data. In certain embodiments, the mitigation action includes generating an alert, assigning a severity score to an alert (e.g., low, moderate, severe, critical), modifying a severity score of an alert, and the like.

While static analysis techniques can detect such cybersecurity objects and threats, runtime data is required to determine if the cybersecurity objects and threats are actually present in runtime. For example, a database having a misconfiguration, such as no password protection, is considered a cybersecurity threat. Typically, an alert is generated in response to detecting such a cybersecurity threat, and a mitigation action is initiated. However, in cloud computing production environments many such alerts are generated, and therefore it is desirable to prioritize alerts based, for example, on a severity of an event. In this example, if a process for managing the database is not present at runtime, then the severity of the cybersecurity threat is actually lower than if the database software was running, and therefore presented an actual cybersecurity threat. It is therefore beneficial to combine static analysis data with runtime data in an efficient manner in order to prioritize responses, such as mitigation actions, to detected cybersecurity threats. This allows to better utilize the compute resources of a cloud computing environment, and improving response time to cybersecurity threats based on actual severity.

Figure 8:
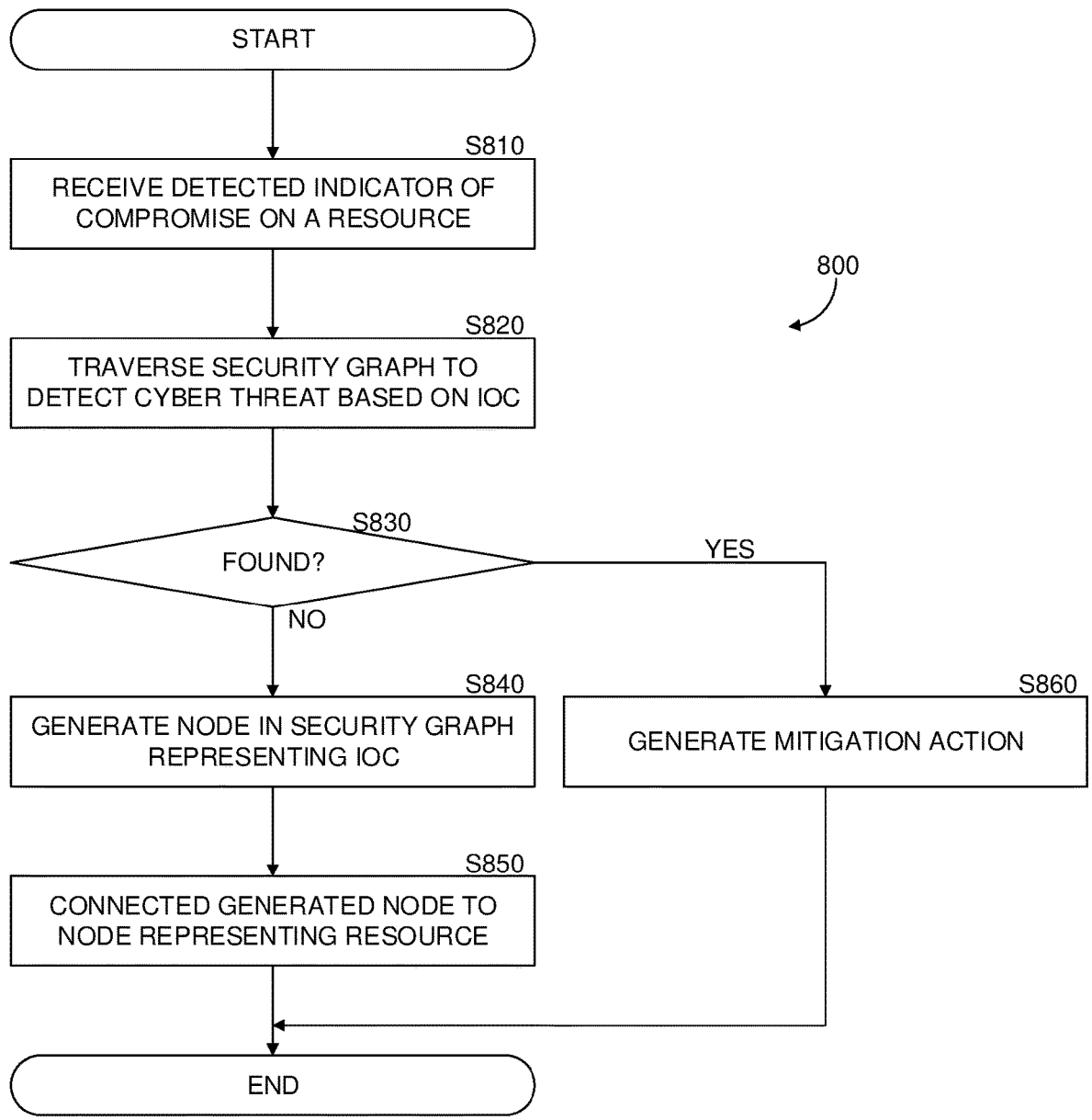
FIG. 8 is an example flowchart of a method for utilizing a security graph in detecting a cybersecurity threat based on an indicator of compromise, implemented in accordance with an embodiment.

FIG. 8 is an example flowchart 800 of a method for utilizing a security graph in detecting a cybersecurity threat based on an indicator of compromise, implemented in accordance with an embodiment.

At S810, an indicator of compromise (IOC) is received. In an embodiment, the IOC is received from a sensor, the sensor configured to detect an IOC. In certain embodiments, an IOC is data, such as network traffic data, login data, access data, a data request, and the like. For example, IOC data indicates, in an embodiment, unusual network traffic, unusual login time, unusual logged-in user session time, a high volume of requests for data, network traffic to restricted domains, network traffic to suspicious geographical domains, mismatched port-application network traffic (i.e. sending command and control communication as a DNS request over port 80), and the like.

In certain embodiments, an IOC data is generated based on an aggregation of events detected on a resource, for example on a virtual machine. In an embodiment, a sensor is configured to store a plurality of events, and generate aggregated data based on the stored plurality of events. For example, network traffic destinations are stored, in an embodiment, to perform anomaly detection, i.e., to detect network traffic destinations which are anomalous.

At S820, a security graph is traversed to detect a cybersecurity threat. In an embodiment, an instruction is generated which, when executed by a graph database, configures a database management system to execute a query for detecting a node in a security graph stored on the graph database. In certain embodiments, the detected node represents a resource on which a sensor is deployed, the sensor generating the IOC data which is received at S810.

In certain embodiments, a security graph is traversed to detect a node representing a cybersecurity threat corresponding to the IOC and connected to a node representing the resource from which the IOC was generated. For example, a query is generated based on the IOC data and executed on the security graph. In an embodiment, execution of the query returns a result.

At S830, a check is performed to determine if the cybersecurity threat was found. In an embodiment, the check includes receiving a result from a query executed on a security graph, and determining if a node representing a resource is connected to a node representing a cybersecurity threat. If 'yes', execution continues at S860. If 'no' execution continues at S840.

At S840, a node is generated to represent the IOC in the security graph. In an embodiment, IOC data is stored with the node. In certain embodiments, an identifier of an IOC may be assigned to the IOC data, and the identifier of the IOC is stored with the node in the graph database.

At S850, an edge is generated to connect the node representing the IOC to a node representing the resource. In an embodiment the resource is a resource from which the IOC originated. For example, an edge may be generated to connect the node representing the IOC to the node representing the resource.

At S860, a mitigation action is generated. In an embodiment, generating a mitigation action includes generating an instruction which when executed configures a computing device to initiate the mitigation action. In an embodiment, the mitigation is initiating an inspection of the resource, generating alert an alert, a combination thereof, and the like. In certain embodiments the alert is generated based on any one of: the IOC data, an identifier of the resource, a predetermined rule, a combination thereof, and the like. In an embodiment, initiating inspection of a resource includes generating an instruction which when executed in a cloud computing environment configures the cloud computing environment to generate an inspectable disk, and provide an inspector workload access to the inspectable disk to inspect the inspectable disk for a cybersecurity threat corresponding to the IOC data.

Figure 9:
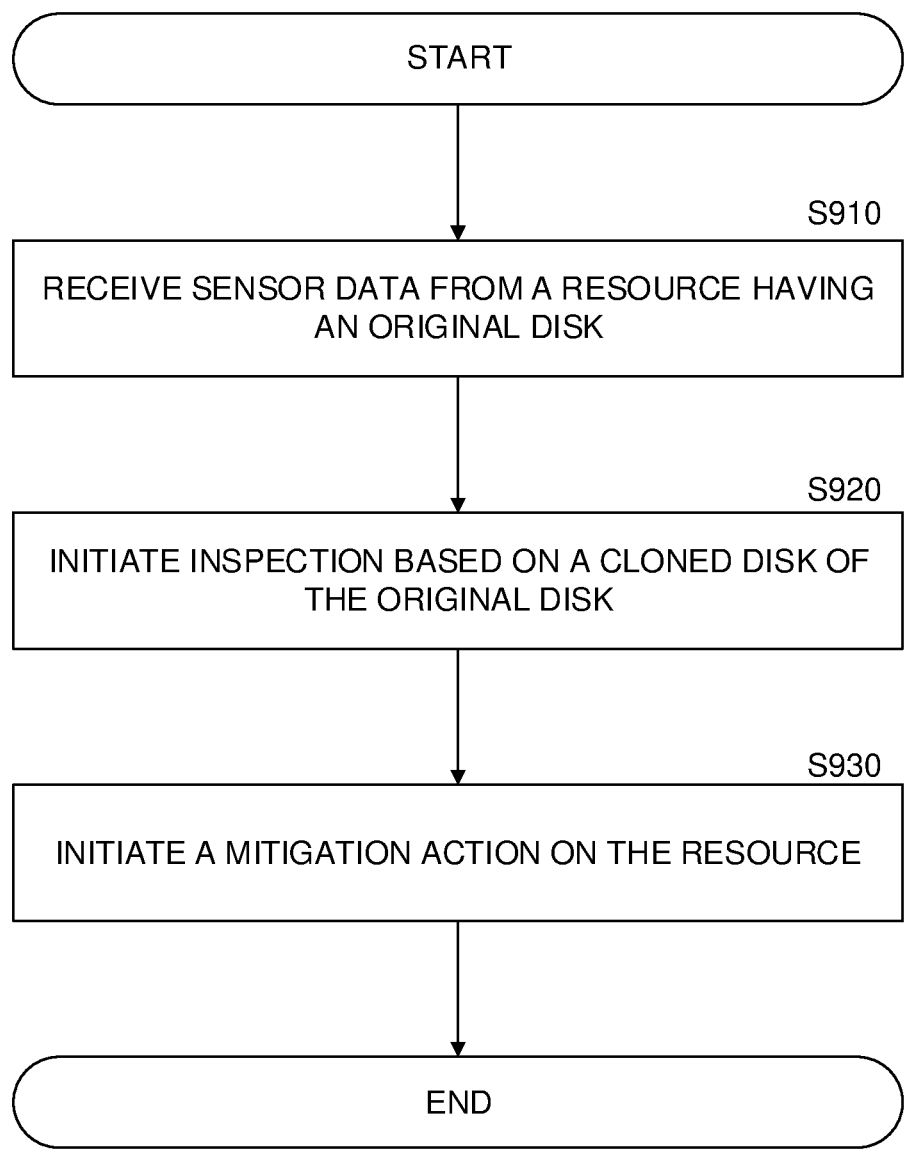
FIG. 9 is an example flowchart of a method for performing cybersecurity inspection based on static analysis and runtime data, implemented in accordance with an embodiment.

FIG. 9 is an example flowchart of a method for performing cybersecurity inspection based on static analysis and runtime data, implemented in accordance with an embodiment.

At S910, sensor data is received. In an embodiment, sensor data is received from a sensor deployed on a resource in a computing environment, such as a cloud computing environment.

In some embodiments, sensor data includes runtime data, such as an identifier of a process loaded to memory, an identifier of a software library loaded in memory, an identifier of a software binary loaded in memory, a combination thereof, and the like.

At S920, inspection is initiated. In an embodiment, an inspection controller is configured to initiate inspection for a cybersecurity object based on the received sensor data. In some embodiments, a received sensor data is a trigger for initiating inspection. For example, according to an embodiment, a received sensor data indicates a potential cybersecurity threat. It is therefore advantageous to initiate inspection for a cybersecurity object, wherein the cybersecurity object indicates a cybersecurity threat, a cybersecurity risk, a vulnerability, a misconfiguration, a combination thereof, and the like.

In certain embodiments, inspecting a resource includes detecting an original disk of the resource, generating a cloned disk by cloning the original disk in the cloned disk, configuring an inspector to inspect the cloned disk, and releasing the cloned disk in response to completing inspection.

In some embodiments, an inspector is configured to store results of an inspection in a security database, for example as data associated with a representation of the resource on which a cybersecurity object, a finding, and the like, is detected. According to an embodiment, a finding is a detection of a cybersecurity object, a cybersecurity threat, a cybersecurity risk, a toxic combination, a misconfiguration, a vulnerability, an exposure, a combination thereof, and the like, which are detected, for example, based on detecting the cybersecurity object.

In an embodiment, a toxic combination occurs when a finding from a sensor data and a finding based on a cybersecurity objected detected by inspection are both found. In some embodiments, a toxic combination includes an indicator from sensor data, a finding, a plurality of sensor data indicators, a plurality of findings, a combination thereof, and the like.

At S930, a mitigation action is initiated. In an embodiment, the mitigation action is based on the received sensor data, the cybersecurity object, a finding, a toxic combination, a combination thereof, and the like.

For example, according to an embodiment, where a toxic combination is detected based on a finding and sensor data, a mitigation action is initiated based on the toxic combination, the finding, the sensor data, a combination thereof, and the like.

In some embodiments, the mitigation action is initiated in the computing environment in which the resource is deployed, on the resource itself, a combination thereof, and the like.

Figure 10:
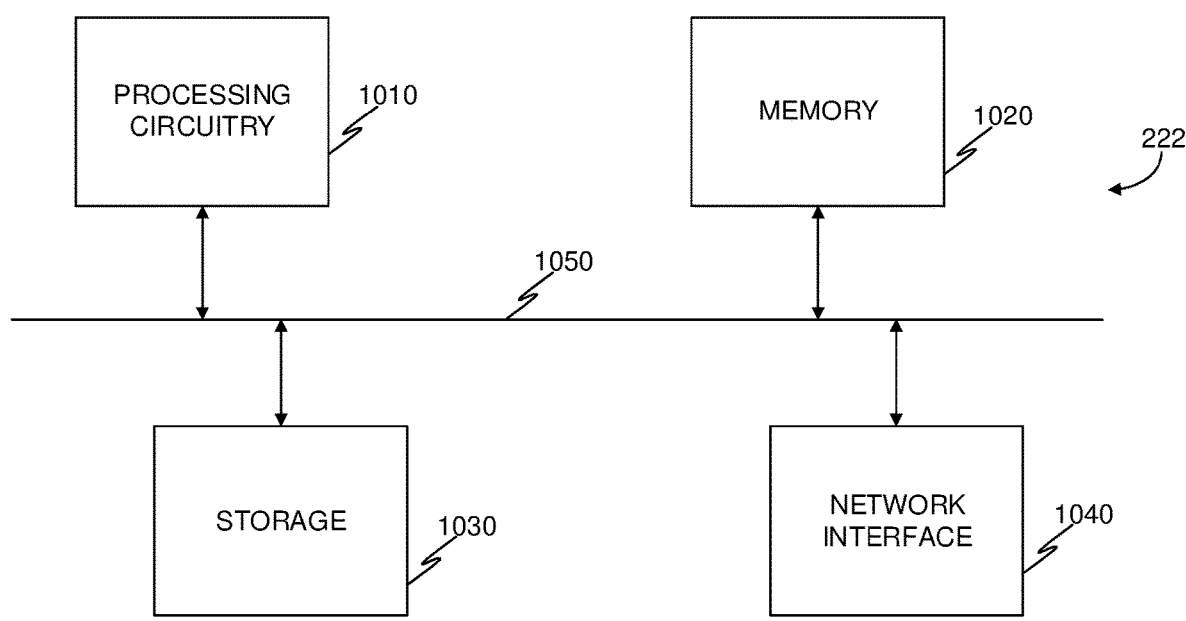
FIG. 10 is an example schematic diagram of an inspection controller according to an embodiment.

FIG. 10 is an example schematic diagram of an inspection controller 222 according to an embodiment. The an inspection controller 222 includes, according to an embodiment, a processing circuitry 1010 coupled to a memory 1020, a storage 1030, and a network interface 1040. In an embodiment, the components of the an inspection controller 222 are communicatively connected via a bus 1050.

In certain embodiments, the processing circuitry 1010 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 1020 is a volatile memory (e.g., random access memory, etc.), a non-volatile memory (e.g., read only memory, flash memory, etc.), a combination thereof, and the like. In some embodiments, the memory 1020 is an on-chip memory, an off-chip memory, a combination thereof, and the like. In certain embodiments, the memory 1020 is a scratch-pad memory for the processing circuitry 1010.

In one configuration, software for implementing one or more embodiments disclosed herein is stored in the storage 1030, in the memory 1020, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 1010, cause the processing circuitry 1010 to perform the various processes described herein, in accordance with an embodiment.

In some embodiments, the storage 1030 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 1040 is configured to provide the an inspection controller 222 with communication with, for example, the inspector 224, the sensor backend 228, the security database 226, a combination thereof, and the like, according to an embodiment.

It should be understood that the embodiments described herein are not limited to the specific architecture illustrated in FIG. 10, and other architectures may be equally used without departing from the scope of the disclosed embodiments.

Furthermore, in certain embodiments the inspector 224, the sensor backend 228, the security database 226, a combination thereof, and the like, may be implemented with the architecture illustrated in FIG. 10. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting cybersecurity risk on a resource in a computing environment, comprising:

configuring a resource deployed in a cloud computing environment to deploy thereon a sensor, the sensor configured to detect runtime data;

detecting runtime data from the sensor of the resource;

generating an inspectable disk based on an original disk of the resource, in response to detecting an event in the runtime data;

initiating inspection based on the detected event in the runtime data for a cybersecurity object on the inspectable disk;

detecting the cybersecurity object on an inspectable disk; and initiating a mitigation action on the resource based on the detected cybersecurity object.

2. The method of claim 1, wherein generating the inspectable disk further comprises:
cloning the original disk into the inspectable disk.

3. The method of claim 2, further comprising:
releasing the inspectable disk in response to completing inspection of the inspectable disk.

4. The method of claim 1, further comprising:
detecting a cybersecurity toxic combination based on the runtime data and the detected cybersecurity object.

5. The method of claim 4, further comprising:
initiating the mitigation action based on the detected cybersecurity toxic combination.

6. The method of claim 1, further comprising:
initiating the mitigation action based on: the detected runtime data, the cybersecurity object, and a combination thereof.

7. The method of claim 1, further comprising:
configuring the sensor to apply a rule on an event detected in the runtime data, the rule including a logical expression and an action; and
configuring the sensor to perform the action in response to applying the rule on the event and receiving a predetermined result.

8. The method of claim 7, further comprising:
configuring the sensor to detect the event based on an identifier of the cybersecurity object.

9. The method of claim 1, wherein the sensor is configured to listen to a data link layer through an extended Berkeley Packet Filter (eBPF) interface.

10. A non-transitory computer-readable medium storing a set of instructions for detecting cybersecurity risk on a resource in a computing environment, the set of instructions comprising:
one or more instructions that, when executed by one or more processors of a device, cause the device to:
configure a resource deployed in a cloud computing environment to deploy thereon a sensor, the sensor configured to detect runtime data;
detect runtime data from the sensor of the resource;
generate an inspectable disk based on an original disk of the resource, in response to detecting an event in the runtime data;
initiate inspection based on the detected event in the runtime data for a cybersecurity object on the inspectable disk
detect the cybersecurity object on an inspectable disk; and
initiate a mitigation action on the resource based on the detected cybersecurity object.

11. A system for detecting cybersecurity risk on a resource in a computing environment comprising:
a processing circuitry;
a memory, the memory containing instructions that, when executed by the processing circuitry, configure the system to:

configure a resource deployed in a cloud computing environment to deploy thereon a sensor, the sensor configured to detect runtime data;
detect runtime data from the sensor of the resource;
generate an inspectable disk based on an original disk of the resource, in response to detecting an event in the runtime data;
initiate inspection based on the detected event in the runtime data for a cybersecurity object on the inspectable disk
detect the cybersecurity object on an inspectable disk; and
initiate a mitigation action on the resource based on the detected cybersecurity object.

12. The system of claim 11, wherein the memory contains further instructions that, when executed by the processing circuitry for generating the inspectable disk, further configure the system to:
clone the original disk into the inspectable disk.

13. The system of claim 12, wherein the memory contains further instructions which when executed by the processing circuitry further configure the system to:
release the inspectable disk in response to completing inspection of the inspectable disk.

14. The system of claim 11, wherein the memory contains further instructions which when executed by the processing circuitry further configure the system to:
detect a cybersecurity toxic combination based on the runtime data and the detected cybersecurity object.

15. The system of claim 14, wherein the memory contains further instructions which when executed by the processing circuitry further configure the system to:
initiate the mitigation action based on the detected cybersecurity toxic combination.

16. The system of claim 11, wherein the memory contains further instructions which when executed by the processing circuitry further configure the system to:
initiate the mitigation action based on:
the detected runtime data, the cybersecurity object, and a combination thereof.

17. The system of claim 11, wherein the memory contains further instructions which when executed by the processing circuitry further configure the system to:
configure the sensor to apply a rule on an event detected in the runtime data, the rule including a logical expression and an action; and
configure the sensor to perform the action in response to applying the rule on the event and receiving a predetermined result.

18. The system of claim 17, wherein the memory contains further instructions which when executed by the processing circuitry further configure the system to:
configure the sensor to detect the event based on an identifier of the cybersecurity object.

19. The system of claim 11, wherein the sensor is configured to listen to a data link layer through an extended Berkeley Packet Filter (eBPF) interface.

* * * * *